US010356690B2

(12) United States Patent
Liu et al.

(10) Patent No.: US 10,356,690 B2
(45) Date of Patent: Jul. 16, 2019

(54) METHOD AND APPARATUS FOR DETERMINING A COMMUNICATION PATH (AS AMENDED)

(71) Applicant: CHINA ACADEMY OF TELECOMMUNICATIONS TECHNOLOGY, Beijing (CN)

(72) Inventors: Jiamin Liu, Beijing (CN); Huiru Kou, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/128,959

(22) PCT Filed: Mar. 4, 2015

(86) PCT No.: PCT/CN2015/073605
§ 371 (c)(1),
(2) Date: Sep. 23, 2016

(87) PCT Pub. No.: WO2015/143973
PCT Pub. Date: Oct. 1, 2015

(65) Prior Publication Data
US 2017/0105164 A1    Apr. 13, 2017

(30) Foreign Application Priority Data

Mar. 25, 2014    (CN) .......................... 2014 1 0114311

(51) Int. Cl.
*H04W 40/00* (2009.01)
*H04W 40/22* (2009.01)
(Continued)

(52) U.S. Cl.
CPC .......... *H04W 40/22* (2013.01); *H04B 7/2606* (2013.01); *H04W 40/125* (2013.01);
(Continued)

(58) Field of Classification Search
CPC ....... H04W 4/16; H04W 48/16; H04W 92/02; H04W 76/02; H04W 48/12; H04W 88/06; H04M 1/72511; H04M 1/72505
See application file for complete search history.

(56) References Cited

U.S. PATENT DOCUMENTS 5,669,060 A * 9/1997 Guimont ............... H04W 76/10
                                                    455/436
8,724,648 B2 * 5/2014 Zeng ................. H04W 72/1289
                                                    370/329
(Continued)

FOREIGN PATENT DOCUMENTS

| CN | 101479999 A | 7/2009 |
| CN | 102821401 A | 12/2012 |
| CN | 103888981 A | 6/2014 |

OTHER PUBLICATIONS

PCT International Search Report for PCT Counterpart Application No. PCT/CN2015/073605, 5 pp. (including English translation), (May 14, 2015).

(Continued)

*Primary Examiner* — Stephen M D Agosta
(74) *Attorney, Agent, or Firm* — Womble Bond Dickinson (US) LLP

(57) ABSTRACT

Disclosed are a communication path determination method and device, which solve the problems of low transmission efficiency and long transmission time delay which may be caused by the existing path which is configured for a small cell needing to access a network for directly communicating through a wireless channel between the small cell and a macro base station. The method comprises: when a wireless node needs to access a network, acquiring, by the wireless node, an optimal communication path from same to the network; and communicating, by the wireless node, with the network through the acquired optimal communication path, (Continued)

wherein the optimal communication path indicates the wireless node to access the network through at least one auxiliary node, and at least one of the at least one auxiliary nodes is a wired node which is directly connected to the network. Since the wireless node accesses the network and communicate with the network through at least one auxiliary node with the function of being capable of providing the data forwarding service for other nodes, the quality and performance of data transmission between the wireless node needing to access the network and the network are improved, and the transmission efficiency of the wireless node is improved.

8 Claims, 4 Drawing Sheets

(51) Int. Cl.
  *H04W 40/12* (2009.01)
  *H04W 72/04* (2009.01)
  *H04B 7/26* (2006.01)
  *H04W 84/04* (2009.01)

(52) U.S. Cl.
  CPC .......... *H04W 72/04* (2013.01); *H04W 84/047* (2013.01); *Y02D 70/126* (2018.01); *Y02D 70/1262* (2018.01); *Y02D 70/34* (2018.01); *Y02D 70/39* (2018.01); *Y02D 70/449* (2018.01)

(56) References Cited

U.S. PATENT DOCUMENTS

| | | | | |
|---|---|---|---|---|
| 8,755,324 | B2* | 6/2014 | Yu | H04W 72/085 370/315 |
| 2004/0264410 | A1* | 12/2004 | Sagi | H04W 36/0005 370/331 |
| 2007/0133488 | A1* | 6/2007 | Muthuswamy | H04L 45/42 370/338 |
| 2007/0189204 | A1* | 8/2007 | Li | H04W 40/24 370/328 |
| 2007/0280453 | A1* | 12/2007 | Kelley | H04L 67/16 379/201.01 |
| 2008/0084856 | A1 | 4/2008 | Ramachandran | |
| 2008/0101318 | A1* | 5/2008 | Taaghol | H04W 36/04 370/342 |
| 2008/0117822 | A1 | 5/2008 | Murphy et al. | |
| 2008/0285501 | A1* | 11/2008 | Zhang | H04L 45/20 370/315 |
| 2009/0154426 | A1* | 6/2009 | Perraud | H04W 36/26 370/332 |
| 2010/0085940 | A1* | 4/2010 | Murphy | H04L 61/2015 370/331 |
| 2010/0128694 | A1* | 5/2010 | Choi-Grogan | H04W 36/0027 370/331 |
| 2011/0019617 | A1* | 1/2011 | Ho | H04W 28/06 370/328 |
| 2011/0080890 | A1* | 4/2011 | Cai | H04W 36/0033 370/331 |
| 2011/0194526 | A1* | 8/2011 | Phan | H04L 41/12 370/329 |
| 2011/0292893 | A1* | 12/2011 | Lee | H04W 74/002 370/329 |
| 2012/0302267 | A1* | 11/2012 | Haines | H04L 12/2825 455/466 |
| 2012/0314689 | A1* | 12/2012 | Wang | H04W 36/12 370/331 |
| 2013/0128755 | A1* | 5/2013 | Ullah | G01S 5/02 370/252 |
| 2013/0142133 | A1* | 6/2013 | Pedersen | H04W 16/10 370/329 |
| 2013/0183971 | A1* | 7/2013 | Tamaki | H04W 36/0061 455/436 |
| 2013/0310052 | A1 | 11/2013 | Timus et al. | |
| 2014/0036776 | A1* | 2/2014 | Al-Shalash | H04W 40/22 370/328 |
| 2014/0213310 | A1* | 7/2014 | Yeh | H04W 72/08 455/501 |

OTHER PUBLICATIONS

PCT Written Opinion of the International Searching Authority for PCT Counterpart Application No. PCT/CN2015/073605, 7 pp., (May 14, 2015).

European Patent Office, Extended European Search Report for corresponding EP Application No. 15769059.5, dated Jun. 28, 2017, 8 pages.

Motorola, "Classification of Relays," 3GPP Draft; R1-083223—Relay Classification, 3rd Generation Partnership Project (3GPP), Mobile Competence Centre, Sophia-Antipolis Cedex, FR, Aug. 12, 2008, 3 pages, vol. 1, No. Jeju, South Korea.

* cited by examiner

If a radio node needs to access a network, then the radio node will obtain an optimum communication path between the radio node and the network, where the radio node is instructed over the optimum communication path to access the network through at least one secondary node, and at least one of the at least one secondary node is a wired node connected directly with the network ∿ 31

The radio node to access the network communicates with the network over the optimum communication path obtained ∿ 32

Fig.3

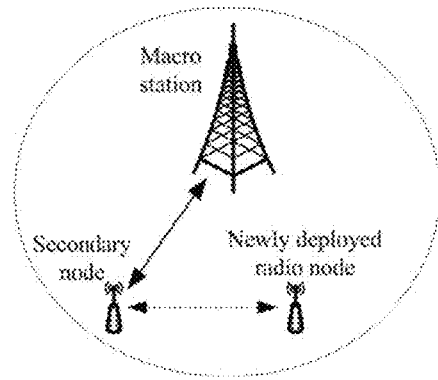

Fig.4

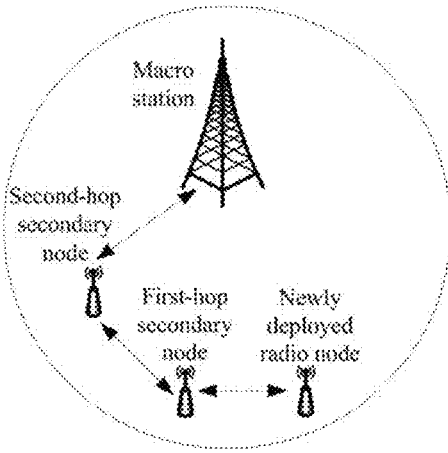

Fig.5

METHOD AND APPARATUS FOR DETERMINING A COMMUNICATION PATH (AS AMENDED)

CROSS-REFERENCE TO RELATED APPLICATIONS

This patent application is a U.S. National Phase Application under 35 U.S.C. § 371 of International Application No. PCT/CN2015/073605, filed on Mar. 4, 2015, entitled COMMUNICATION PATH DETERMINATION METHOD AND DEVICE, which claims the benefit of Chinese Patent Application No. 201410114311.0, filed with the Chinese Patent Office on Mar. 25, 2014, and entitled "Communication Path Determination Method and Device", the content of which was incorporated by reference in its entirety.

FIELD

The present invention relates to the field of communications, and particularly to a method and apparatus for determining a communication path.

BACKGROUND

In a Long Term Evolution (LTE) system, nodes at the network side are generally connected over wired links, that is, eNBs are connected over wired links, and the eNBs and core network nodes (e.g., a Mobility Management Entity (MME), a Serving Gateway (S-GW), etc.) are also connected over wired links, as illustrated in FIG. 1.

Alike in an architecture with a radio relay node, legacy eNBs are also connected over wired links, and the eNBs and core network nodes are also connected over wired links; and the relay node and a Donor eNB (DeNB) serving the relay node communicate via a wireless interface, as illustrated in FIG. 2.

In future development of a mobile communication system, as there are growing transmission rates and capacities as demanded by users for radio broadband services, one of working means to improve the capacity and the throughput of a network is ultra-dense deployment of access nodes to better satisfy the demand of the users. As can be expected, more access nodes will be sure to be introduced in an area with a significant throughput demand in the future to thereby greatly increase the density of deployment in a cell. Each small cell covers only a small area in which the users proximate to each other can be provided with high transmission efficiency. On the other hand, in order to better address the issues of interference coordination between the different small cells, and mobility of the users, the small cell need to have some dependency upon a macro cell covering a large area, that is, there is an interface required between the small cells and the macro cell to transmit control signaling and even user data.

If the small cells are deployed densely, then wired backhaul links (i.e., links between the small cells and the network) may not be deployed in all the scenarios, so wireless backhaul links will be also a typical scenario for the sake of convenient deployment, and convenient of the nomadic access nodes. In such a scenario, the small cells need to communicate with the network side nodes and/or a macro station covering a large area via a wireless interface.

In the prior art, if there is a small cell to be connected with a network over a wireless path, then the small cell will generally communicate wirelessly with a macro station directly. However in a common scenario, for example, where there is a long distance between the small cell and the macro station, there is a shielding obstacle between the small cell and the macro station, etc., there may be such a poor quality of a radio channel between the small cell and the macro station that if the small cell communicates wirelessly with the macro station directly, then there may be low transmission efficiency, and a significant transmission delay.

SUMMARY

Embodiments of the invention provide a method and apparatus for determining a communication path so as to address the problem in the prior art that if a small cell to access a network is configured with a path for direction communication over a radio channel between the small cell and a macro station, then there may be low transmission efficiency, and a significant transmission delay.

An embodiment of the invention provides a method for determining a communication path, the method including:

obtaining, by a radio node to access a network, an optimum communication path between the radio node and the network; and communicating, by the radio node, with the network over the optimum communication path obtained;

wherein the radio node is instructed over the optimum communication path to access the network through at least one secondary node, and at least one of the at least one secondary node is a wired node connected directly with the network.

In an embodiment, obtaining, by the radio node to access the network, the optimum communication path between the radio node and the network includes:

selecting, by the radio node, one of nodes around the radio node with a function capable of providing another node with a data forwarding service as a first-hop secondary node through which the radio node accesses the network, and which is connected directly with the radio node, and determining the optimum communication path between the radio node and the network as accessing the network through the first-hop secondary node;

or determining, by the radio node, the at least one secondary node in the optimum communication path between the radio node and the network according to a preconfigured correspondence relationship between the radio node and the secondary node, and determining the optimum communication path between the radio node and the network as accessing the network through the at least one secondary node;

or receiving, by the radio node, the at least one secondary node, notified of by the network side node, selected by the network side node for the radio node, and determining the optimum commutation path between the radio node and the network as accessing the network through the at least one secondary node, wherein the network side node determines the optimum commutation path between the radio node and the network according to obtained information about an access of the radio node to the network.

Furthermore selecting, by the radio node, one of the nodes around the radio node with a function capable of providing another node with a data forwarding service as the first-hop secondary node through which the radio node accesses the network, and which is connected directly with the radio node includes:

selecting, by the radio node, a node satisfying a preset condition from the nodes around the radio node with a function capable of providing another node with a data forwarding service as the first-hop secondary node through which the radio node accesses the network, and which is connected directly with the radio node; or transmitting, by the radio node, a first request message to the nodes around the radio node with a function capable of providing another node with a data forwarding service, and selecting one of the nodes as the first-hop secondary node through which the radio node accesses the network, and which is connected directly with the radio node, according to a received first response message returned by the at least one node around the radio node with a function capable of providing another node with a data forwarding service, wherein the first request message requests for an access to the network through the node receiving the first request message, and the first response message notifies the radio node to access the network of whether the node transmitting the first response message is capable of acting as a secondary node for the radio node to access the network.

In an embodiment, before the radio node receives the at least one secondary node, notified of by the network side node, selected by the network side node for the radio node, the method further includes:

measuring, by the radio node, signals transmitted by the nodes around the radio node with a function capable of providing another node with a data forwarding service, and reporting measured first measurement results to the network side node to request the network side node for determining the optimum communication path for the radio node; or measuring, by the radio node, signals transmitted by the nodes around the radio node with a function capable of providing another node with a data forwarding service, and reporting those first measurement results satisfying a preset threshold among measured first measurement results to the network side node to request the network side node for determining the optimum communication path for the radio node.

Further to any one of the embodiments above, determining, by the radio node, the nodes around the radio node with a function capable of providing another node with a data forwarding service includes:

determining, by the radio node, that any one node transmitting indication information has a function capable of providing another node with a data forwarding service, upon reception of a message carrying the indication information transmitted by the node, wherein the indication information indicates that the node has a function capable of providing another node with a data forwarding service; or transmitting, by the radio node, a first message to the respective nodes around the radio node, and determining that any one node transmitting a second message has a function capable of providing another node with a data forwarding service, upon reception of the second message returned by the node, wherein the first message requests for the second messages to be returned by those nodes with a function capable of providing another node with a data forwarding service among the respective nodes around the radio node.

In an embodiment, before the radio node receives the at least one secondary node, notified of by the network side node, selected by the network side node for the radio node, the method further includes:

transmitting, by the radio node, a detecting signal to the nodes around the radio node, wherein the nodes around the radio node measure the detecting signal upon reception of the detecting signal, and report measured second measurement results, or those second measurement results satisfying a preset threshold among the measured second measurement results to the network side node to request the network side node for determining the optimum communication path for the radio node; or transmitting, by the radio node, a first request message to the nodes around the radio node with a function capable of providing another node with a data forwarding service, wherein the first request message requests for an access to the network through the nodes receiving the first request message, and if the nodes receiving the first request message determine that they are capable of acting as secondary nodes for the radio node to access the network, then the nodes transmit second request messages to the network side node, wherein the second request messages notify the network side node that the nodes transmitting the second request messages are capable of acting as secondary nodes for the radio node to access the network.

Further to any one of the embodiments above, communicating, by the radio node, with the network over the obtained optimum communication path includes:

obtaining, by the radio node, from information preconfigured by the network side node a resource configured by the network side for communication between the radio node and a first-hop secondary node connected directly therewith in the optimum communication path, and communicating with the first-hop secondary node over the resource configured by the network side node; or receiving, by the radio node, resource configuration information transmitted by the network side node, obtaining a resource configured by the network side node for communication between the radio node and a first-hop secondary node connected directly therewith in the optimum communication path, and communicating with the first-hop secondary node over a resource reconfigured by the network side node; or reporting, by the radio node, the amount of data to be transmitted by the radio node, to the network side node; and receiving, by the radio node, resource configuration information transmitted by the network side node, obtaining a resource configured by the network side node for current communication between the radio node and a first-hop secondary node connected directly therewith in the optimum communication path, and transmitting the data to be transmitted, to the first-hop secondary node over the resource configured by the network side node; or determining, by the radio node, a resource for use in communication with a first-hop secondary node connected directly with the radio node in the optimum communication path, by negotiating with the first-hop secondary node.

Further to any one of the embodiments above, communicating, by the radio node, with the network over the optimum communication path obtained includes:

transmitting, by the radio node, uplink data to be transmitted to the network side node, to a first-hop secondary node connected directly with the radio node in the optimum communication path, wherein the first-hop secondary node transmits the uplink data to the corresponding network side node over a channel between the first-hop secondary node and the network according to a locally stored mapping relationship between the channel of the first-hop secondary node to the network, and a channel of the first-hop secondary node to the radio node; and receiving, by the radio node, downlink data, from the network side node, transmitted by a first-hop secondary node connected directly with the radio node in the optimum communication path, wherein the first-hop secondary node determines the radio node corresponding to the downlink data transmitted by the network according to the locally stored mapping relationship between the channel of the first-hop secondary node to the network, and a channel of the first-hop secondary node to the radio node, and forwards the downlink data to the radio node determined, upon reception of the downlink data.

Further to any one of the embodiments above, the method further includes:

if the radio node determines that a link quality between the radio node, and a first-hop secondary node connected directly with the radio node in the optimum communication path is below a preset threshold, then disconnecting from the first-hop secondary node, and reselecting a new optimum communication path for an access to the network; or if the radio node receives a notification message transmitted by a first-hop secondary node connected directly with the radio node in the optimum communication path, then disconnecting from the first-hop secondary node, and reselecting a new optimum communication path for an access to the network, wherein the notification message notifies the radio node that the first-hop secondary node is not capable of continuing with providing the radio node with a data forwarding service.

An embodiment of the invention provides another method for determining a communication path, the method including:

determining, by a network side node, any one radio node to access a network; and determining, by the network side node, an optimum communication path between the radio node and the network, wherein the radio node is instructed over the optimum communication path to communicate with the network through at least one secondary node, and at least one of the at least one secondary node is a wired node connected directly with the network.

In an embodiment, determining, by the network side node, the optimum communication path between the radio node and the network includes:

selecting, by the network side node, those nodes satisfying a preset condition from the respective nodes located around the radio node and capable of providing another node with a data forwarding service, by measuring in advance, determining the at least one secondary node in the optimum communication path between the radio node and the network according to paths between the selected respective nodes and the network, and configuring the radio node and the selected respective secondary nodes respectively with a correspondence relationship between the radio node and the selected at least one secondary node;

or determining, by the network side node, the optimum communication path between the radio node and the network according to obtained information about an access of the radio node to the network, Furthermore determining, by the network side node, the optimum communication path between the radio node and the network according to the obtained information about an access of the radio node to the network includes:

receiving, by the network side node, first measurement results reported by the radio node, selecting those nodes satisfying a preset condition from the respective nodes located around the radio node and capable of providing another node with a data forwarding service according to the received first measurement results, determining the secondary nodes in the optimum communication path between the radio node and the network according to paths between the respective nodes and the network determined, and notifying the radio node and the selected respective secondary nodes, wherein the first measurement results are obtained by the radio node measuring respectively signals transmitted by the respective nodes around the radio node with a function capable of providing another node with a data forwarding service or receiving, by the network side node, a second measurement result reported by at least one node around the radio node to access the network with a function capable of providing another node with a data forwarding service, selecting those nodes satisfying a preset condition from the respective nodes reporting the second measurement results according to the received second measurement results, determining the secondary nodes in the optimum communication path between the radio node and the network according to paths between the selected respective nodes and the network, and notifying the radio node and the respective secondary nodes determined, wherein the second measurement results are obtained by the nodes, around the radio node to access the network with a function capable of providing another node with a data forwarding service, measuring a detecting signal transmitted by the radio node; or receiving, by the network side node, a second request message transmitted by at least one node around the radio node to access the network with a function capable of providing another node with a data forwarding service, selecting those nodes satisfying a preset condition from the respective nodes transmitting the second request messages, determining the secondary nodes in the optimum communication path between the radio node and the network according to paths between the selected respective nodes and the network, and notifying the radio node and the respective nodes determined, wherein the second request messages notify the network side node that the nodes transmitting the second request messages are capable of acting as secondary nodes for the radio node to access the network.

Further to any one of the embodiments above, the method further includes:

pre-configuring, by the network side node, a resource for communication between nodes connected directly in the optimum communication path, and configuring the resource to the radio node, and the at least one secondary node in the optimum communication path; or reconfiguring, by the network side node, an available resource for communication between nodes connected directly in the optimum communication path according to a current resource use condition of the network, and configuring the resource to the radio node, and the at least one secondary node in the optimum communication path via resource configuration information; or configuring, by the network side node, a resource for communication between nodes connected directly in the optimum communication path according to a current resource use condition of the network, and the amounts of data to be transmitted by the respective nodes in the optimum communication path, and configuring the resource to the radio node, and the at least one secondary node in the optimum communication path via resource configuration information.

Further to any one of the embodiments above, the method further includes:

if the network side node needs to transmit downlink data to the radio node, then determining a first-hop secondary node connected directly with the radio node in the optimum communication path, and transmitting the downlink data to the first-hop secondary node aver a channel between the first-hop secondary node and the network so that the first-hop secondary node forwards the downlink data to the radio node.

Further to any one of the embodiments above, the method farther includes:

determining, by the network side node again, an optimum communication path between the radio node and the network upon reception of a notification message transmitted by a first-hop secondary node connected directly with the radio node in the optimum communication path, wherein the notification message notifies the network side node that the first-hop secondary node is not capable of continuing with providing the radio node with a data forwarding service.

An embodiment of the invention provides a radio node including:

a path obtaining module configured, if the rod in node including the path obtaining module needs to access a network, to obtain an optimum communication path between the radio node and the network; and a communicating module configured to communicate with the network over the optimum communication path obtained by the path obtaining module;

wherein the radio node is instructed over the optimum communication path to access the network through at least one secondary node, and at least one of the at least one secondary node is a wired node connected directly with the network.

In an embodiment, the path obtaining module is configured: to select one of nodes around the radio node with a function capable of providing another node with a data forwarding service as a first-hop secondary node through which the radio node accesses the network, and which is connected directly with the radio node, and to determine the optimum communication path between the radio node and the network as accessing the network through the first-hop secondary node; or to determine the at least one secondary node in the optimum communication path between the radio node and the network according to a preconfigured correspondence relationship between the radio node and the secondary node, and to determine the optimum communication path between the radio node and the network as accessing the network through the at least one secondary node; or to receive the at least one secondary node, notified of by the network side node, selected by the network side node for the radio node, and to determine the optimum commutation path between the radio node and the network as accessing the network through the at least one secondary node, wherein the network side node determines the optimum commutation path between the radio node and the network according to obtained information about an access of the radio node to the network.

Furthermore the path obtaining module configured to select one of the nodes around the radio node with a function capable of providing another node with a data forwarding service as the first-hop secondary node through which the radio node accesses the network, and which is connected directly with the radio node is configured:

to select a node satisfying a preset condition from the nodes around the radio node with a function capable of providing another node with a data forwarding service as the first-hop secondary node through which the radio node accesses the network, and which is connected directly with the radio node; or to transmit a first request message to the nodes around the radio node with a function capable of providing another node with a data forwarding service, and to select one of the nodes as the first-hop secondary node through which the radio node accesses the network, and which is connected directly with the radio node, according to a received first response message returned by the at least one node around the radio node with a function capable of providing another node with a data forwarding service, wherein the first request message requests for an access to the network through the node receiving the first request message, and the first response message notifies the radio node to access the network of whether the node transmitting the first response message is capable of acting as a secondary node for the radio node to access the network, In an embodiment, the path obtaining module is further configured: before the at least one secondary node, notified of by the network side node, selected by the network side node for the radio node is received, to measure signals transmitted by the nodes around the radio node with a function capable of providing another node with a data forwarding service, and to report measured first measurement results to the network side node to request the network side node for determining the optimum communication path for the radio node; or before the at least one secondary node, notified of by the network side node, selected by the network side node for the radio node is received, to measure signals transmitted by the nodes around the radio node with a function capable of providing another node with a data forwarding service, and to report those first measurement results satisfying a preset threshold among measured first measurement results to the network side node to request the network side node for determining the optimum communication path for the radio node.

Further to any one of the embodiments above, the path obtaining module configured to determine the nodes around the radio node with a function capable of providing another node with a data forwarding service is configured:

to determine that any one node transmitting indication information has a function capable of providing another node with a data forwarding service, upon reception of a message carrying the indication information transmitted by the node, wherein the indication information indicates that the node has a function capable of providing another node with a data forwarding service; or to transmit a first message to the respective nodes around the radio node, and to determine that any one node transmitting a second message has a function capable of providing another node with a data forwarding service, upon reception of the second message returned by the node, wherein the first message requests for the second messages to be returned by those nodes with a function capable of providing another node with a data forwarding service among the respective nodes around the radio node.

In an embodiment, the path obtaining module is further configured:

before the at least one secondary node, notified of by the network side node, selected by the network side node for the radio node is received, to transmit a detecting signal to the nodes around the radio node, wherein the nodes around the radio node measure the detecting signal upon reception of the detecting signal, and report measured second measurement results, or those second measurement results satisfying a preset threshold among the measured second measurement results to the network side node to request the network side node for determining the optimum communication path for the radio node; or before the at least one secondary node, notified of by the network side node, selected by the network side node for the radio node is received, to transmit a first request message to the nodes around the radio node with a function capable of providing another node with a data forwarding service, wherein the first request message requests for an access to the network through the nodes receiving the first request message, and if the nodes receiving the first request message determine that they are capable of acting as secondary nodes for the radio node to access the network, then the nodes transmit second request messages to the network side node, wherein the second request messages notify the network side node that the nodes transmitting the second request messages are capable of acting as secondary nodes for the radio node to access the network.

Further to any one of the embodiments above, the communicating module is configured:

to obtain from information preconfigured by the network side node a resource configured by the network side for communication between the radio node, and a first-hop secondary node connected directly therewith in the optimum communication path, and to communicate with the first-hop secondary node over the resource configured by the network side node; or to receive resource configuration information transmitted by the network side node, to obtain a resource configured by the network side node for communication between the radio node, and a first-hop secondary node connected directly therewith in the optimum communication path, and to communicate with the first-hop secondary node over a resource reconfigured by the network side node; or to report the amount of data to be transmitted by the radio node, to the network side node; and to receive resource configuration information transmitted by the network side node, to obtain a resource configured by the network side node for current communication between the radio node and a first-hop secondary node connected directly therewith in the optimum communication path, and to transmit the data to be transmitted, to the first-hop secondary node over the resource configured by the network side node; or to determine a resource for use in communication with a first-hop secondary node connected directly with the radio node in the optimum communication path, by negotiating with the first-hop secondary node Further to any one of the embodiments above, the communicating module is configured:

to transmit uplink data to be transmitted to the network side node, to a first-hop secondary node connected directly with the radio node in the optimum communication path, wherein the first-hop secondary node transmits the uplink data to the corresponding network side node over a channel between the first-hop secondary node and the network according to a locally stored mapping relationship between the channel of the first-hop secondary node to the network, and a channel of the first-hop secondary node to the radio node; and to receive downlink data, from the network side node, transmitted by a first-hop secondary node connected directly with the radio node in the optimum communication path, wherein the first-hop secondary node determines the radio node corresponding to the downlink data transmitted by the network according to the locally stored mapping relationship between the channel of the first-hop secondary node to the network, and a channel of the first-hop secondary node to the radio node, and forwards the downlink data to the radio node determined, upon reception of the downlink data.

Further to any one of the embodiments above, the path obtaining module is further configured:

if it is determined that a link quality between the radio node, and a first-hop secondary node connected directly with the radio node in the optimum communication path is below a preset threshold, to disconnect the radio node from the first-hop secondary node, and to reselect a new optimum communication path for an access to the network; or if a notification message transmitted by a first-hop secondary node connected directly with the radio node in the optimum communication path is received, to disconnect the radio node from the first-hop secondary node, and to reselect a new optimum communication path for an access to the network, wherein the notification message notifies the radio node that the first-hop secondary node is not capable of continuing with providing the radio node with a data forwarding service, An embodiment of the invention provides a network side node including:

a first processing module configured to determine any one radio node to access a network; and a second processing module configured to determine an optimum communication path between the radio node and the network, wherein the radio node is instructed over the optimum communication path to communicate with the network through at least one secondary node, and at least one of the at least one secondary node is a wired node connected directly with the network, In an embodiment, the second processing module is configured:

to select those nodes satisfying a preset condition from the respective nodes located around the radio node and capable of providing another node with a data forwarding service, by measuring in advance, to determine the at least one secondary node in the optimum communication path between the radio node and the network according to paths between the selected respective nodes and the network, and to configure the radio node and the selected respective secondary nodes respectively with a correspondence relationship between the radio node and the selected at least one secondary node; or to determine the optimum communication path between the radio node and the network according to obtained information about an access of the radio node to the network.

Furthermore the second processing module configured to determine the optimum communication path between the radio node and the network according to the obtained information about an access of the radio node to the network is configured:

to receive first measurement results reported by the radio node, to select those nodes satisfying a preset condition from the respective nodes located around the radio node and capable of providing another node with a data forwarding service according to the received first measurement results, to determine the secondary nodes in the optimum communication path between the radio node and the network according to paths between the selected respective nodes and the network, and to notify the radio node and the respective secondary nodes determined, wherein the first measurement results are obtained by the radio node measuring respectively signals transmitted by the respective nodes around the radio node with a function capable of providing another node with a data forwarding service; or to receive a second measurement result reported by at least one node around the radio node to access the network with a function capable of providing another node with a data forwarding service, to select those nodes satisfying a preset condition from the respective nodes reporting the second measurement results according to the received second measurement results, to determine the secondary nodes in the optimum communication path between the radio node and the network according to paths between the selected respective nodes and the network, and to notify the radio node and the respective secondary nodes determined, wherein the second measurement results are obtained by the nodes, around the radio node to access the network with a function capable of providing another node with a data forwarding service, measuring a detecting signal transmitted by the radio node; or to receive a second request message transmitted by at least one node around the radio node to access the network with a function capable of providing another node with a data forwarding service, to select those nodes satisfying a preset condition from the respective nodes transmitting the second request messages, to determine the secondary nodes in the optimum communication path between the radio node and the network according to paths between the selected respective nodes and the network, and to notify the radio node and the respective nodes determined, wherein the second request messages notify the network side node that the nodes transmitting the second request messages are capable of acting as secondary nodes for the radio node to access the network.

Further to any one of the embodiments above, the network side node further includes a third processing module configured;

to pre-configure a resource for communication between nodes connected directly in the optimum communication path, and to configure the resource to the radio node, and the at least one secondary node in the optimum communication path; or to reconfigure an available resource for communication between nodes connected directly in the optimum communication path according to a current resource use condition of the network, and to configure the resource to the radio node, and the at least one secondary node in the optimum communication path via resource configuration information; or to configure a resource for communication between nodes connected directly in the optimum communication path according to a current resource use condition of the network, and the amounts of data to be transmitted by the respective nodes in the optimum communication path, and to configure the resource to the radio node, and the at least one secondary node in the optimum communication path via resource configuration information.

Further to any one of the embodiments above, the network side node further includes a fourth processing module configured:

if downlink data need to be transmitted to the radio node, to determine a first-hop secondary node connected directly with the radio node in the optimum communication path, and to transmit the downlink data to the first-hop secondary node over a channel between the first-hop secondary node and the network so that the first-hop secondary node forwards the downlink data to the radio node.

Further to any one of the embodiments above, the second processing module is further configured: to determine again an optimum communication path between the radio node and the network upon reception of a notification message transmitted by a first-hop secondary node connected directly with the radio node in the optimum communication path, wherein the notification message notifies the network side node that the first-hop secondary node is not capable of continuing with providing the radio node with a data forwarding service.

An embodiment of the invention provides another radio node including a transceiver, and at least one processor connected with the transceiver, wherein:

the processor is configured, if the radio node including the processor needs to access a network, to obtain an optimum communication path between the radio node and the network; and to communicate with the network over the obtained optimum communication path;

wherein the radio node is instructed over the optimum communication path to access the network through at least one secondary node, and at least one of the at least one secondary node is a wired node connected directly with the network.

In an embodiment, the processor is configured: to select one of nodes around the radio node including the processor with a function capable of providing another node with a data forwarding service as a first-hop secondary node through which the radio node accesses the network, and which is connected directly with the radio node, and to determine the optimum communication path between the radio node and the network as accessing the network through the first-hop secondary node; or to determine the at least one secondary node in the optimum communication path between the radio node including the processor and the network according to a preconfigured correspondence relationship between the radio node and the secondary node, and to determine the optimum communication path between the radio node and the network as accessing the network through the at least one secondary node; or to receive through the transceiver the at least one secondary node, notified of by the network side node, selected by the network side node for the radio node including the processor, and to determine the optimum commutation path between the radio node and the network as accessing the network through the at least one secondary node, wherein the network side node determines the optimum commutation path between the radio node and the network according to obtained information about an access of the radio node to the network.

In an embodiment, the processor configured to select one of the nodes around the radio node including the processor with a function capable of providing another node with a data forwarding service as the first-hop secondary node through which the radio node accesses the network, and which is connected directly with the radio node is configured:

to select a node satisfying a preset condition from the nodes around the radio node including the processor with a function capable of providing another node with a data forwarding service as the first-hop secondary node through which the radio node accesses the network, and which is connected directly with the radio node; or to trigger the transceiver to transmit a first request message to the nodes around the radio node including the processor with a function capable of providing another node with a data forwarding service, and to select one of the nodes as the first-hop secondary node through which the radio node accesses the network, and which is connected directly with the radio node, according to a first response message, received through the transceiver, returned by the at least one node around the radio node with a function capable of providing another node with a data forwarding service, wherein the first request message requests for an access to the network through the node receiving the first request message, and the first response message notifies the radio node to access the network of whether the node transmitting the first response message is capable of acting as a secondary node for the radio node to access the network.

In an embodiment, the processor is further configured: before the transceiver receives the at least one secondary node, notified of by the network side node, selected by the network side node for the radio node including the transceiver, to measure signals transmitted by the nodes around the radio node with a function capable of providing another node with a data forwarding service, and to trigger the transceiver to report measured first measurement results to the network side node to request the network side node for determining the optimum communication path for the radio node; or before the transceiver receives the at least one secondary node, notified of by the network side node, selected by the network side node for the radio node including the transceiver, to measure signals transmitted by the nodes around the radio node with a function capable of providing another node with a data forwarding service, and to trigger the transceiver to report those first measurement results satisfying a preset threshold among measured first measurement results to the network side node to request the network side node for determining the optimum communication path for the radio node.

Further to any one of the embodiments above, the processor configured to determine the nodes around the radio node with a function capable of providing another node with a data forwarding service is configured:

to determine that any one node transmitting indication information has a function capable of providing another node with a data forwarding service, after the transceiver receives a message carrying the indication information transmitted by the node, wherein the indication information indicates that the node has a function capable of providing another node with a data forwarding service; or to determine that any one node transmitting a second message has a function capable of providing another node with a data forwarding service, after the transceiver receives the second message returned by the node, wherein the transceiver transmits a first message to the respective nodes around the radio node, and the first message requests for the second messages to be returned by those nodes with a function capable of providing another node with a data forwarding service among the respective nodes around the radio node.

Further to any one of the embodiments above, the processor is further configured:

before the at least one secondary node, notified of by the network side node, selected by the network side node for the radio node including the processor is received, to transmit a detecting signal to the nodes around the radio node, wherein the nodes around the radio node measure the detecting signal upon reception of the detecting signal, and report measured second measurement results, or those second measurement results satisfying a preset threshold among the measured second measurement results to the network side node to request the network side node for determining the optimum communication path for the radio node; or before the at least one secondary node, notified of by the network side node, selected by the network side node for the radio node including the processor is received, to transmit a first request message to the nodes around the radio node with a function capable of providing another node with a data forwarding service, wherein the first request message requests for an access to the network through the nodes receiving the first request message, and if the nodes receiving the first request message determine that they are capable of acting as secondary nodes for the radio node to access the network, then the nodes transmit second request messages to the network side node, wherein the second request messages notify the network side node that the nodes transmitting the second request messages are capable of acting as secondary nodes for the radio node to access the network.

Further to any one of the embodiments above, the processor is configured:

to obtain from information preconfigured by the network side node a resource configured by the network side for communication between the radio node including the processor, and a first-hop secondary node connected directly therewith in the optimum communication path, and to communicate with the first-hop secondary node over the resource configured by the network side node; or to obtain a resource configured by the network side node for communication between the radio node including the processor, and a first-hop secondary node connected directly therewith in the optimum communication path according to resource configuration information, transmitted by the network side node, received by the transceiver, and to communicate with the first-hop secondary node over a resource reconfigured by the network side node; or to obtain a resource configured by the network side node for current communication between the radio node and a first-hop secondary node connected directly therewith in the optimum communication path according to resource configuration information, transmitted by the network side node, received by the transceiver, and to transmit data to be transmitted, to the first-hop secondary node over the resource configured by the network side node, wherein the transceiver reports the amount of data to be transmitted by the radio node including the transceiver, to the network side node; or to determine a resource for use in communication with a first-hop secondary node connected directly with the radio node including the processor in the optimum communication path, by negotiating with the first-hop secondary node.

Further to any one of the embodiments above, the transceiver is configured:

to transmit uplink data to be transmitted to the network side node, to a first-hop secondary node connected directly with the radio node including the transceiver in the optimum communication path, wherein the first-hop secondary node transmits the uplink data to the corresponding network side node over a channel between the first-hop secondary node and the network according to a locally stored mapping relationship between the channel of the first-hop secondary node to the network, and a channel of the first-hop secondary node to the radio node; and to receive downlink data, from the network side node, transmitted by the first-hop secondary node connected directly with the radio node including the transceiver in the optimum communication path, wherein the first-hop secondary node determines the radio node corresponding to the downlink data transmitted by the network according to the locally stored mapping relationship between the channel of the first-hop secondary node to the network, and a channel of the first-hop secondary node to the radio node, and forwards the downlink data to the radio node determined, upon reception of the downlink data.

Further to any one of the embodiments above, the process is further configured:

if it is determined that a link quality between the radio node including the processor, and a first-hop secondary node connected directly with the radio node in the optimum communication path is below a preset threshold, to disconnect the radio node from the first-hop secondary node, and to reselect a new optimum communication path for an access to the network; or if the transceiver receives a notification message transmitted by a first-hop secondary node connected directly with the radio node including the transceiver in the optimum communication path, to disconnect the radio node from the first-hop secondary node, and to reselect a new optimum communication path for an access to the network, wherein the notification message notifies the radio node that the first-hop secondary node is not capable of continuing with providing the radio node with a data forwarding service.

An embodiment of the invention provides another network side node including a transceiver, and at least one processor connected with the transceiver, wherein:

the processor is configured to determine any one radio node to access a network; and to determine an optimum communication path between the radio node and the network, wherein the radio node is instructed over the optimum communication path to communicate with the network through at least one secondary node, and at least one of the at least one secondary node is a wired node connected directly with the network.

In an embodiment, the processor is configured:

to select those nodes satisfying a preset condition from the respective nodes located around the radio node and capable of providing another node with a data forwarding service, by measuring in advance, to determine the at least one secondary node in the optimum communication path between the radio node and the network according to paths between the selected respective nodes and the network, and to configure the radio node and the selected respective secondary nodes respectively with a correspondence relationship between the radio node and the selected at least one secondary node; or to determine the optimum communication path between the radio node and the network according to obtained information about an access of the radio node to the network, Furthermore the processor configured to determine the optimum communication path between the radio node and the network according to the obtained information about an access of the radio node to the network is configured:

to select those nodes satisfying a preset condition from the respective nodes located around the radio node and capable of providing another node with a data forwarding service according to first measurement results, reported by the radio node, received by the transceiver, to determine the secondary nodes in the optimum communication path between the radio node and the network according to paths between the selected respective nodes and the network, and to notify the radio node and the respective secondary nodes determined, wherein the first measurement results are obtained by the radio node measuring respectively signals transmitted by the respective nodes around the radio node with a function capable of providing another node with a data forwarding service; or to receive through the transceiver a second measurement result reported by at least one node around the radio node to access the network with a function capable of providing another node with a data forwarding service, to select those nodes satisfying a preset condition from the respective nodes reporting the second measurement results, to determine the secondary nodes in the optimum communication path between the radio node and the network according to paths between the selected respective nodes and the network, and to notify the radio node and the respective secondary nodes determined, wherein the second measurement results are obtained by the nodes, around the radio node to access the network with a function capable of providing another node with a data forwarding service, measuring a detecting signal transmitted by the radio node; or to receive through the transceiver a second request message transmitted by at least one node around the radio node to access the network with a function capable of providing another node with a data forwarding service, to select those nodes satisfying a preset condition from the respective nodes transmitting the second request messages, to determine the secondary nodes in the optimum communication path between the radio node and the network according to paths between the selected respective nodes and the network, and to notify the radio node and the respective nodes determined, wherein the second request messages notify the network side node that the nodes transmitting the second request messages are capable of acting as secondary nodes for the radio node to access the network.

Further to any one of the embodiments above, the processor is further configured:

to pre-configure a resource for communication between nodes connected directly in the optimum communication path, and to configure the resource to the radio node, and the at least one secondary node in the optimum communication path; or to reconfigure an available resource for communication between nodes connected directly in the optimum communication path according to a current resource use condition of the network, and to configure the resource to the radio node, and the at least one secondary node in the optimum communication path via resource configuration information; or to configure a resource for communication between nodes connected directly in the optimum communication path according to a current resource use condition of the network, and the amounts of data to be transmitted by the respective nodes in the optimum communication path, and to configure the resource to the radio node, and the at least one secondary node in the optimum communication path via resource configuration information.

Further to any one of the embodiments above, the processor is further configured; if downlink data need to be transmitted to the radio node, to determine a first-hop secondary node connected directly with the radio node in the optimum communication path of the radio node, and to transmit the downlink data to the first-hop secondary node over a channel between the first-hop secondary node and the network so that the first-hop secondary node forwards the downlink data to the radio node.

Further to any one of the embodiments above, the processor is further configured: to determine again an optimum communication path between the radio node and the network after the transceiver receives a notification message transmitted by a first-hop secondary node connected directly with the radio node in the optimum communication path, wherein the notification message notifies the network side node that the first-hop secondary node is not capable of continuing with providing the radio node with a data forwarding service.

The preset condition as referred to in the methods and the apparatus according to the embodiments of the invention includes at least one of:

there is an optimum link quality between the node and the radio node;

the link quality between the node and the radio node is above a preset quality threshold;

data transmitted by the radio node can be carried over a backhaul link of the node;

there is the shortest transmission delay over a link between the node and the radio node;

the transmission delay over the link between the node and the radio node is below a preset delay threshold;

there is the shortest transmission delay over the backhaul link of the node;

the transmission delay over the backhaul link of the node is below a preset delay threshold;

a transmission rate over the backhaul link of the node is no less than a wireless interface rate;

there is the highest transmission rate over the link between the node and the radio node; and the transmission rate over the link between the node and the radio node is above a preset rate threshold.

In the methods and the apparatus according to the embodiments of the invention, the radio node to access the network obtains the optimum communication path between the radio node and the network, where the radio node is instructed over the optimum communication path to communicate with the network through at least one secondary node, and at least one of the at least one secondary node is a wired node connected directly with the network; and the radio node communicates with the network over the obtained optimum communication path, thus improving the quality and performance of data transmission between the radio node and the network, and improving the transmission efficiency of the radio node.

BRIEF DESCRIPTION OF THE DRAWINGS

FIG. 3 is a schematic diagram of a method for determining a communication path according to an embodiment of the invention;

FIG. 4 is a schematic diagram of a single-hop node communication path according to an embodiment of the invention;

FIG. 5 is a schematic diagram of a multi-hop ode communication path according to an embodiment of the invention;

DETAILED DESCRIPTION OF THE EMBODIMENTS

Figure 1:
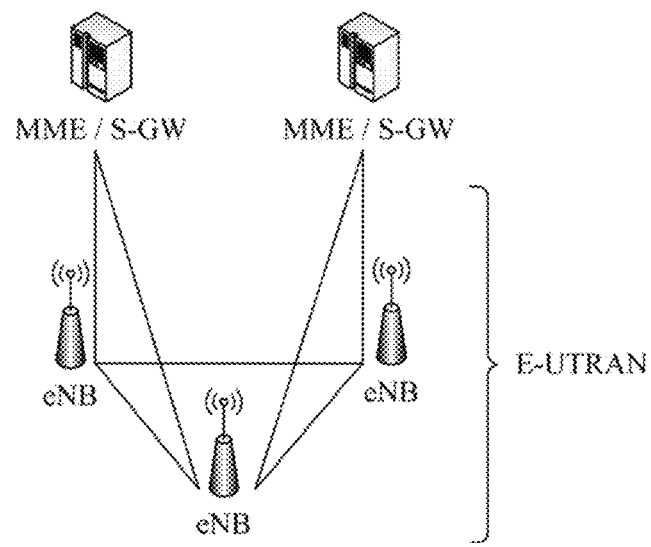
FIG. 1 is a schematic diagram of the communication links between the network side nodes in the LTE system in the prior art.
Figure 2:
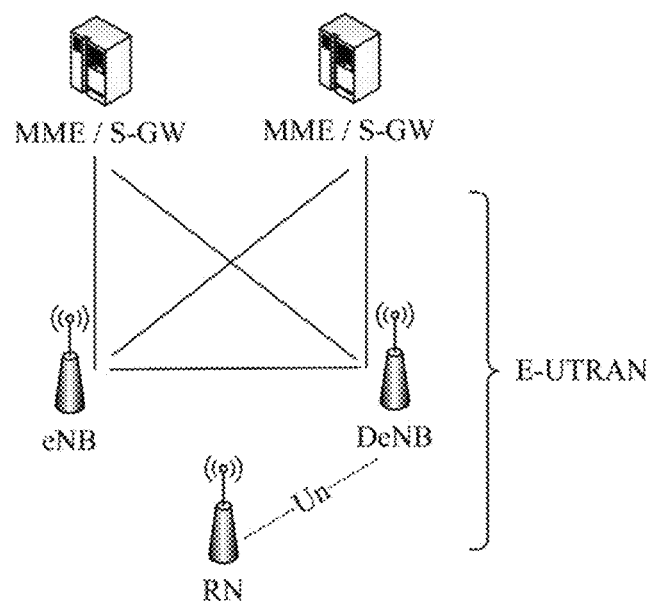
FIG. 2 is a schematic diagram of the architecture with a radio relay node in the LTE system in the prior art.

In the embodiments of the invention, if any one radio node needs to access a network, then the radio node will access the network and communicate with the network through at least one secondary node with a function capable of providing another node with a data forwarding service to thereby improve the quality and performance of data transmission between the radio node and the network, and improving the transmission efficiency of the radio node.

The embodiments of the invention will be described below in further details with reference to the drawings. It shall be appreciated that the embodiments described here are merely intended to illustrate and describe the invention, but not to limit the invention.

An embodiment of the invention provides a method for determining a communication path as illustrated in FIG. 3, where the method includes the following operations:

In the operation 31, if a radio node needs to access a network, then the radio node will obtain an optimum communication path between the radio node and the network, where the radio node is instructed over the optimum communication path to access the network through at least one secondary node, and at least one of the at least one secondary node is a wired node connected directly with the network;

In this operation, the radio node to access the network may he a radio node newly deployed in the network, or if a radio node deployed in the network needs to access the network again, then the radio node to access the network will be instructed over an optimum communication path obtained by the radio node to access the network through at least one secondary node, that is, the radio node will be instructed over the optimum communication path to communicate with a network side node (e.g., a macro station) through the at least one secondary node.

The secondary node as referred to in the embodiment of the invention is a node at least which has a function capable of providing another node with a data forwarding service, and which has the function enabled.

Here the secondary node may be a wired backhaul connected node (i.e., a wired node, e.g., a wired cell), or may be a radio backhaul connected node (i.e., a radio node, e.g., a radio cell), but at least one of the at least one secondary node involved in the optimum communication path obtained by the radio node in the operation 31 is a wired node connected directly with the network.

It shall be noted that data and signaling are transmitted between a wired node among the at least one secondary node in the optimum communication path obtained by the radio node to access the network in the operation 31, and the network side node (e.g., the macro station) in a wired transmission protocol; and if the at least one secondary node includes a radio node, then the radio node will also obtain communication paths between the radio node and the network side node, and select an optimum communication path for communication with the network side node, where the radio node can communicate with the network side node over a path established between the radio node and the network, or can reselect at least one secondary node for an access to the network.

Taking a newly deployed radio node as an example, in real deployment, if a radio node (e.g., a radio small cell) needs to be deployed in some area due to an improvement in system capacity or throughput, then the radio node can access the network in there approaches, where firstly a wired backhaul link is deployed between the radio node and the macro station for direct communication (a wired backhaul link may not be deployed in all the places); secondly a radio backhaul link is deployed between the radio node and the macro station for direct communication (the link quality of the radio backhaul link may not be optimum in some scenarios, for example, the link quality may be below a preset quality threshold); and thirdly the radio node communicates with the network side node (e.g., the macro station) through at least one secondary station over the optimum communication path in the embodiment of the invention, where the link quality of the optimum communication path is higher than the link quality of the radio backhaul link over which the radio node accesses the network directly.

The optimum communication path as referred to in this operation refers to that the radio node to access the network accesses the network through the at least one secondary node, and the optimum communication path satisfies at least one of the following conditions: there is an optimum link quality, the link quality is above a preset quality threshold, there is a large transmission bandwidth, the transmission bandwidth is above a preset bandwidth threshold, there is the shortest transmission delay, the transmission delay is below a preset delay threshold, there is the highest link transmission rate, and the link transmission rate is above a preset rate threshold.

in the operation 32, the radio node to access the network communicates with the network over the optimum communication path obtained.

In this operation, the radio node to access the network communicates with the network side node over the optimum communication path obtained, that is, the radio node communicates with the network side node through the at least one secondary node. Particularly the at least one secondary node forwards data and signaling between the radio node and the network side node, that is, the at least one secondary node forwards uplink data transmitted by the radio node, to the network side node upon reception of the uplink data, and forwards downlink data transmitted by the network side node, to the radio node upon reception of the downlink data.

In an embodiment of the invention, the radio node to access the network obtains the optimum communication path between the radio node and the network, where the radio node is instructed over the optimum communication path to access the network through the at least one secondary node, and at least one of the at least one secondary node is a wired node connected directly with the network; and the radio node communicates with the network over the optimum communication path obtained, thus improving the quality and performance of data transmission between the radio node and the network, and the transmission efficiency of the radio node, In an embodiment, the radio node to access the network obtains the optimum communication path between the radio node and the network in the operation 31 in the following three approaches:

In a first approach, the radio node to access the network determines a communication path between the radio node and the network, that is, the radio node determines a secondary node in the communication path between the radio node and the network.

In this approach, particularly in the operation 31, the radio node to access the network selects one of nodes around the radio node with a function capable of providing another node with a data forwarding service as a first-hop secondary node through which the radio node accesses the network, and which is connected directly with the radio node, and determines the optimum communication path between the radio node and the network as accessing the network through the first-hop secondary node selected.

In this approach, the optimum communication path determined by the radio node to access the network between the radio node and the network includes a single-hop node communication path (that is, the radio node accesses the network through one secondary node) and a multi-hop node communication path (that is, the radio node accesses the network through at least two secondary nodes).

I. If the first-hop secondary node determined by the radio node to access the network is a wired node, that is, the first-hop secondary node is connected directly with the network over a wired link, then the optimum communication path determined by the radio node will be the radio node to the secondary node (i.e., the first-hop secondary node) to the network side node, i.e., a single-hop node communication path, so that the radio node can communicate with the network through the wired node selected by the radio node, where the selected first-hop secondary node forwards data transmitted between the radio node and the network, over the wired link established between the first-hop secondary node and the network, particularly as illustrated in FIG. 4 where a solid line represents a wired backhaul link, and a dotted line represents a radio backhaul link.

II. If the first-hop secondary node determined by the radio node to access the network is a radio node, that is, there is no wired link for direct communication between the first-hop secondary node and the network, then the optimum communication path determined by the radio node will be the radio node to the first-hop secondary node to a second-hop secondary node to . . . to the network side node, particularly as illustrated in FIG. 5 where a solid line represents a wired backhaul link, and a dotted line represents a radio backhaul link, so that the radio node can communicate with the network through the first-hop secondary node selected by the radio node, a path established between the first-hop secondary node and the network, or at least one secondary node selected by the first-hop secondary node for the first-hop secondary node to the network.

Particularly if the selected first-hop secondary node accesses the network over the path established between the first-hop secondary node and the network, then the second-hop secondary node will be a node connected with the first-hop secondary node in the path established by the first-hop secondary node to the network, a third-hop secondary node is anode connected with the second -hop secondary node in the path established by the first-hop secondary node to the network, and so on; and If the selected first-hop secondary node accesses the network through at least one secondary node selected by the first-hop secondary node, then the first-hop secondary node will select a node satisfying a preset condition from nodes around the first-hop secondary node with a function capable of providing another node with a data forwarding service as the second-hop secondary node through which the radio node accesses the network, and which is connected directly with the first-hop secondary node, and the second-hop secondary node will forward data transmitted between the radio node and the network over a path established between the second-hop secondary node and the network, or at least one secondary node selected by the second-hop secondary node for the second-hop secondary node to the network, and an on until it is connected with the network side node or a wired node, thus determining the optimum communication path between the radio node and the network.

In this approach, the first-hop secondary node can alternatively be a macro station.

In this approach, the radio node to access the network can notify the network side node about the optimum communication path between the radio node and the network; or the first-hop secondary node selected by the radio node can notify the network side node of the optimum communication path between the radio node and the network; or the first-hop secondary node selected by the radio node can notify the network side node that the radio node accesses the network over the path established between the first-hop secondary node and the network.

In this approach, the operation 31 is further performed in the following two approaches:

In an approach 11, the radio node to access the network selects a node satisfying a preset condition from the nodes around the radio node with a function capable of providing another node with a data forwarding service as the first-hop secondary node through which the radio node accesses the network, and which is connected directly with the radio node.

The preset condition as referred to in the embodiment of the invention includes at least one of:

There is an optimum link quality between the node and the radio node;

The link quality between the node and the radio node is above a preset quality threshold;

Data transmitted by the radio node can be carried aver a backhaul link of the node;

There is the shortest transmission delay over the backhaul link of the node;

The transmission delay over the backhaul link of the node is below a preset delay threshold;

A transmission rate over the backhaul link of the node is no less than a wireless interface rate;

There is the shortest transmission delay over a link between the node and the radio node;

The transmission delay over the link between the node and the radio node is below a preset delay threshold;

There is the highest transmission rate over the link between the node and the radio node; and The transmission rate over the link between the node and the radio node is above a preset rate threshold.

In this approach, the radio node to access the network selects the first-hop secondary node thereof from the nodes around the radio node with a function capable of providing another node with a data forwarding service under a preset condition, and further communicates with the network over the path established between the first-hop secondary node and the network, or through the at least one secondary node selected by the first-hop secondary node for the first-hop secondary node to the network. Preferably the radio node to access the network communicates with the network through the selected first-hop secondary node over the path established between the first-hop secondary node and the network.

Particularly the radio node to access the network notifies the first-hop secondary node thereof after selecting the first-hop secondary node, and accordingly the first-hop secondary node determines whether to provide the radio node with a data forwarding service over the path established between the first-hop secondary node and the network, according to a load condition of the path established between the first-hop secondary node and the network; and if not, then first-hop secondary node selects the at least one secondary node for the first-hop secondary node to the network to establish the optimum communication path between the first-hop secondary node and the network.

In an approach 12, the radio node to access the network transmits a first request message to the nodes around the radio node with a function capable of providing another node with a data forwarding service, and selects one of the nodes as the first-hop secondary node through which the radio node accesses the network, and which is connected directly with the radio node, according to a received first response message returned by the at least one node around the radio node with a function capable of providing another node with a data forwarding service, where the first request message requests for an access to the network through the node receiving the first request message, and the first response message notifies the radio node to access the network of whether the node transmitting the first response message is capable of acting as a secondary node for the radio node to access the network.

In this approach, the radio node to access the network transmits the first request message to the nodes around the radio node with a function capable of providing another node with a data forwarding service, to request for an access to the network through the nodes receiving the first request message; and accordingly the nodes receiving the first request message determine whether they are capable of acting as secondary nodes for the radio node to access the network, according to their link conditions (e.g., link loads, backhaul information between the nodes and the network, etc.), and notify in the first response message the radio node of whether they are capable of acting as secondary nodes for the radio node to access the network. Fore example, 1-bit indication information is carried in the first response message to notify the radio node of whether they are capable of acting as secondary nodes for the radio node to access the network.

Preferably the first response message further carries backhaul information between the nodes receiving the first request message, and the network so that the radio node to access the network selects one of the nodes, where the backhaul information includes delay information, data bandwidth information, number-of-radio-hops information, etc.

In a second approach, the network side node (e.g., entity functioning for Operation and Maintenance (OAM), a macro station, a network side control node (e.g., a Mobility Management Entity (MME)), a Serving Gateway (SGW), a Packet Data Network (PDN) Gateway (PGW)) selects the at least one secondary node for the radio node to access the network by measuring in advance, and pre-configures the radio node with the secondary node configured for the radio node, that is, the network side pre-configures the radio node with the optimum communication path, and configures each radio node and the secondary node corresponding thereto with a correspondence relationship between the radio node and the secondary node.

In this approach, particularly in the operation 31, the radio node to access the network determines the at least one secondary node in the optimum communication path between the radio node and the network according to the preconfigured correspondence relationship between the radio node and the secondary node, and determines the optimum communication path between the radio node and the network as accessing the network through the at least one secondary node.

In this approach, if the network side node configures the radio node to access the network with a wired node connected directly with the network over a wired link as a first-hop secondary node connected directly with the radio node (that is, configures one secondary node), then the optimum communication path configured by the network side node for the radio node will be a single-hop node communication path; and if the network side node configures the radio node to access the network with at least two secondary nodes, then the optimum communication path configured by the network side node for the radio node will be a multi-hop node communication path.

In a third approach, the network side node determines the optimum communication path between the radio node to access the network, and the network (i.e., the secondary node required for the radio node to the network), according to obtained information about an access of the radio node to the network, and notifies the radio node, and the secondary node thereof, In this approach, particularly in the operation 31, the radio node to access the network receives the at least one secondary node, notified of by the network side node, selected by the network side node for the radio node, and determines the optimum commutation path between the radio node and the network as accessing the network through the at least one secondary node.

In this approach, if the network side node selects for the radio node to access the network a wired node connected directly with the network over a wired connection as a first-hop secondary node connected directly with the radio node (that is, selects one secondary node), then the radio node will determine the optimum communication path between the radio network and the network as a single-hop node communication path; and if the network side node selects at least two secondary nodes for the radio node to access the network, then the radio node will determine the optimum communication path between the radio network and the network as a multi-hop node communication path.

This approach further includes the following three approaches:

In an approach 31, the network side node configures the radio node to access the network with the at least one secondary node according to first measurement results reported by the radio node.

In this approach, before the operation 31, the method further includes:

The radio node to access the network measures signals transmitted by the nodes around the radio node with a function capable of providing another node with a data forwarding service, and reports the measured first measurement results to the network side node; or The radio node to access the network measures signals transmitted by the nodes around the radio node with a function capable of providing another node with a data forwarding service, and reports those nodes satisfying a preset threshold among the measured first measurement results to the network side node.

Here the radio node to access the network can measure using an obtained common signal (e.g., a common pilot signal) transmitted by each node; and since the coverage area of the radio node is typically so small that the radio node may not be covered by the common signal, the radio node can alternatively measure using an obtained dedicated signal (e.g., a dedicated signal configured for optimizing a path of the radio node) transmitted by each node, particularly as described in 3GPP TS 36.214.

Furthermore the network side node receives the first measurement results reported by the radio node to access the network, selects those nodes satisfying the preset condition from the respective nodes located around the radio node and capable of providing another node with a data forwarding service according to the received first measurement results, determines the at least one secondary node in the optimum communication path between the radio node and the network according to paths between the selected respective nodes and the network, and notifies the radio node and the selected respective secondary nodes.

In an approach 32, the network side node configures the radio node to access the network with the at least one secondary node according to second measurement results reported by the nodes around the radio node.

In this approach, before the operation 31, the method further includes:

The radio node to access the network transmits a detecting signal to the nodes around the radio node, where the nodes around the radio node measure the detecting signal transmitted by the radio node, and reports the second measurement results of the measurement to the network side node, upon reception of the detecting signal.

Furthermore the network side node receives the second measurement results reported by the nodes around the radio node to access the network with a function capable of providing another node with a data forwarding service, selects those nodes satisfying the preset condition from the respective nodes located around the radio node and capable of providing another node with a data forwarding service according to the received second measurement results, determines the at least one secondary node in the optimum communication path between the radio node and the network according to the paths between the selected respective nodes and the network, and notifies the radio node and the respective secondary nodes determined.

In an approach 33, the network side node determines for the radio node to access the network the optimum communication path to the network upon reception of second request messages transmitted by the nodes around the radio node with a function capable of providing another node with a data forwarding service.

In this approach, before the operation 31, the method includes:

The radio node to access the network transmits a first request message to the nodes around the radio node with a function capable of providing another node with a data forwarding service, where the first request message requests for an access to the network through the nodes receiving the first request message, and the nodes receiving the first request message transmit the second request messages to the network side node upon determining that they are capable of acting as secondary nodes for the radio node to access the network, where the second request messages notify the network side node that the nodes receiving the second request message are capable of acting as secondary nodes for the radio node to access the network.

Preferably the second request messages further carries backhaul information between the nodes receiving the first request message, and the network so that the network side node selects one of the nodes, where the backhaul information includes delay information, data bandwidth information, number-of-radio-hops information, etc.

Further to any one of the embodiments above, the radio node to access the network determines the nodes around the radio node with a function capable of providing another node with a data forwarding service as follows:

The radio node determines that any one node transmitting indication information has a function capable of providing another node with a data forwarding service, upon reception of a message carrying the indication information transmitted by the node, where the indication information indicates that the node has a function capable of providing another node with a data forwarding service; or The radio node transmits a first message to the respective nodes around the radio node, and determines that any one node transmitting a second message has a function capable of providing another node with a data forwarding service, upon reception of the second message returned by the node, where the first message requests for the second messages to be returned by those nodes with a function capable of providing another node with a data forwarding service among the respective nodes around the radio node.

Further to any one of the embodiments above, in the operation 32, the radio node to access the network communicates with the network over the obtained optimum communication path in the following fourth approaches:

In a first approach, the radio node to access the network obtains from information preconfigured by the network side node a resource configured by the network side for communication between the radio node and the first-hop secondary node connected directly therewith in the optimum communication path of the radio node, and communicates with the first-hop secondary node over the resource configured by the network side node.

In this approach, the network side node configures statically the resource for the optimum communication path of the radio node, where the network is planed so that a resource for communication between any two directly connected nodes in the optimum communication path of the radio node is determined, and configured, for example, by an OAM system, to the respective nodes in the optimum communication path, and thereafter the two directly connected nodes negotiate about the configured resource to be used.

In a second approach, the radio node to access the network receives resource configuration information transmitted by the network side node, obtains a resource configured by the network side node for communication between the radio node and the first-hop secondary node connected directly therewith in the optimum communication path of the radio node, and communicates with the first-hop secondary node over a resource reconfigured by the network side node.

In this approach, the network side node configures semi-statically a resource for the optimum communication path of the radio node, that is, the network side node can allocate a semi-static resource for radio transmission between directly connected nodes in the optimum communication path according to a current resource use condition of the network, where the resource can be reconfigured according to the amount of traffic, and can be deleted if there is no traffic being transmitted. After the resource is configured semi-statically for the respective nodes in the optimum communication path, the respective nodes need to negotiate about the resource to be particularly used.

In a third approach, the radio node to access the network reports the amount of data to be transmitted by the radio node, to the network side node; and the radio node receives resource configuration information transmitted by the network side node, obtains a resource configured by the network side node for current communication between the radio node and the first-hop secondary node connected directly therewith in the optimum communication path of the radio node, and transmits the data to be transmitted, to the first-hop secondary node over the resource configured by the network side node.

In this approach, the network side node configures dynamically the resource in the optimum communication path of the radio node, that is, the network side node can allocate in real time a resource for radio transmission between directly connected nodes in the optimum communication path according to a current resource use condition of the network, where the resource is allocated in a sophisticated scheduling algorithm according to the amounts of traffic currently to be transmitted by the respective nodes, and transmits the resource scheduling results to the respective nodes in the optimum communication path. The transmitting terminal between directly connected nodes transmits and the receiving terminal between directly connected nodes receives in the scheduling resource no that the transmitting process is completed.

In a fourth approach, the radio node to access the network determines a resource for use in communication with the first-hop secondary node connected directly with the radio node in the optimum communication path, by negotiating with the first-hop secondary node, By way of an example, the radio node to access the network obtains idle resources available thereto, and notifies the first-hop secondary node of the obtained resources; the radio node receives such one of the resources transmitted by the first-hop secondary node that is available to the first-hop secondary node, and idle; and the radio node communicates with the first-hop secondary node over the idle resource available to both of them.

In another example, the first-hop secondary node dedicates a part of resources available thereto as resources for use in communication with the radio node, or the radio node to access the network dedicates a part of resources available thereto as resources for use in communication with the first-hop secondary node, or both the radio node to access the network and the first-hop secondary node perform radio sensing, and determine resources lying in spatial ranges reachable by and available to both the radio node and the first-hop secondary node as resources for use in communication between them.

Further to any one of the first approach to the fourth approach, if the first-hop secondary node communicates with the network over the path established between the first-hop secondary node and the network, then the respective nodes in the path established between the first-hop secondary node and the network can communicate over a resource configured by the network side node for the path to thereby save a resource overhead.

Further to any one of the embodiments above, preferably in the operation 32:

The radio node to access the network transmits uplink data to be transmitted to the network side node, to the first-hop secondary node connected directly with the radio node in the optimum communication path between the radio node and the network, and the first-hop secondary node transmits the uplink data to the corresponding network side node over a channel between the first-hop secondary node and the network according to a locally stored mapping relationship between the channel of the first-hop secondary node to the network, and a channel of the first-hop secondary node to the radio node; and The radio node to access the network receives downlink data, from the network side node, transmitted by the first-hop secondary node connected directly with the radio node in the optimum communication path between the radio node and the network, where the first-hop secondary node determines the radio node corresponding to the downlink data transmitted by the network according to the locally stored mapping relationship between the channel of the first-hop secondary node to the network, and a channel of the first-hop secondary node to the radio node, and forwards the downlink data to the determined radio node, upon reception of the downlink data.

In this approach, the radio node to access the network is addressed by proxying a channel as follows: the first-hop secondary node proxies channels in the user plane (e.g., S1-U and X2-U) and the control plane (e.g., S1-MME and X2-C) of the radio node, that is, the first-hop secondary node maintains a mapping relationship between two segments of channels including a channel between the first-hop secondary node and the network side node, and another channel between the first-hop secondary node to the radio node to access the network, and the first-hop secondary node manages and stores the mapping relationship. If there are downlink data arriving at the first-hop secondary node, then the first-hop secondary node will map the downlink data to the corresponding channel of the radio node according to the mapping relationship, and further transmit the downlink data to the radio node.

In this approach, the network side node does not know the mapping relationship between the first-hop secondary node and the radio node to access the network.

Further to any one of the embodiments above, the method further includes:

If the radio node to access the network determines that a link quality between the radio node, and the first-hop secondary node connected directly therewith in the optimum communication path thereof is below a preset threshold, then the radio node will be disconnected from the first-hop secondary node, and reselect anew optimum communication path for an access to the network; or If the radio node to access the network receives a notification message transmitted by the first-hop secondary node connected directly therewith in the optimum communication path thereof, then the radio node will be disconnected from the first-hop secondary node, and reselect a new optimum communication path for an access to the network, where the notification message notifies the radio node that the first-hop secondary node is not capable of continuing with providing the radio node with a data forwarding service.

Particularly if a heavy load of the first-hop secondary node connected directly with the radio node to access the network in the optimum communication path of the radio node, or another problem occurs during communication, then the first-hop secondary node will transmit the notification message to the radio node or the network side node to notify the radio node or the network side node that the first-hop secondary node is not capable of continuing with providing the radio node with a data forwarding service, so that the radio node or the network side node initiates a procedure of reestablishing an optimum communication path of the radio node.

Figure 6:
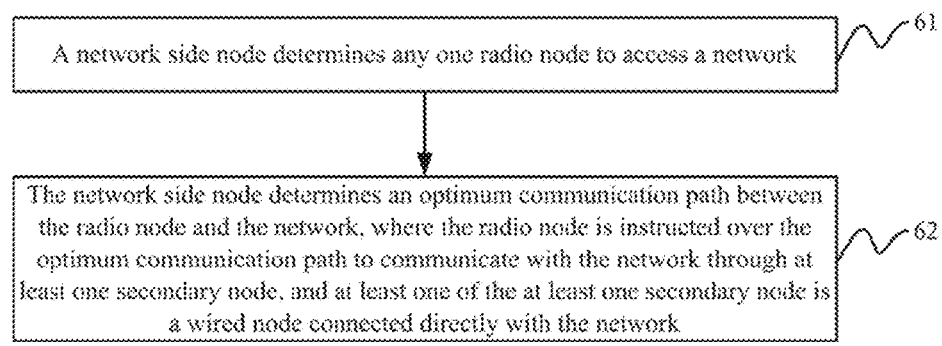
FIG. 6 is a schematic diagram of another method for determining a communication path according to an embodiment of the invention.

Based upon the same inventive idea, an embodiment of the invention further provides a method for determining a communication path as illustrated in FIG. 6, where the method includes:

In the operation 61, a network side node determines any one radio node to access a network.

In this operation, the radio node to access the network may be a radio node newly deployed in the network, or a radio node deployed in the network to access the network again.

Taking a newly deployed radio node as an example, in real deployment, if a radio node needs to be deployed in some area due to an improvement in system capacity or throughput, then firstly preferably a wired backhaul link will be deployed between the radio node and a macro station for direct communication; if no wired backhaul link can be deployed, then a radio backhaul link will be deployed between the radio node and the macro station for direct communication; and if a link quality of the radio backhaul link for direct communication between the radio node and the macro station is below a preset threshold, then an optimum communication path between the radio node and the network will be determined in the operation 62;

In the operation 62, the network side node determines an optimum communication path between the radio node and the network, where the radio node is instructed over the optimum communication path to communicate with the network through at least one secondary node, and at least one of the at least one secondary node is a wired node connected directly with the network.

The secondary node as referred to in the embodiment of the invention is a node at least Which has a function capable of providing another node with a data forwarding service, and which has the function enabled.

Here the secondary node may be a wired backhaul connected node (i.e., a wired node, e.g., a wired cell), or may be a radio backhaul connected node (i.e., a radio node, e.g., a radio cell), but at least one of the at least one secondary node involved in the optimum communication path determined by the network side node in the operation 62 is a wired node connected directly with the network.

In the embodiment of the invention, the network side node determines the optimum communication path between the radio node and the network after determining any one radio node to access the network, where the radio node is instructed over the optimum communication path to communicate with the network through the at least one secondary node, and at least one of the at least one secondary node is a wired node connected directly with the network, thus improving the quality and performance of data transmission between the radio node and the network, and the transmission efficiency of the radio node.

The network side node in the embodiment of the invention can be an entity functioning for OAM, a macro station, or a network side control node, e.g., an MME, an SGW, a PGW, etc.

In an embodiment, the network side node determines the optimum communication path between the radio node to access the network, and the network in the operation 61 in the following two approaches:

In an approach A, the network side node configures the radio node to access the network with the at least one secondary nodes by measuring in advance, particularly as described in the second approach above.

In this approach, particularly in the operation 61, the network side node selects those nodes satisfying a preset condition from the respective nodes located around the radio node to access the network and capable of providing another node with a data forwarding service, by measuring in advance, determines the at least one secondary node in the optimum communication path between the radio node and the network according to paths between the selected respective nodes and the network, and configures the radio node and the selected respective secondary nodes respectively with a correspondence relationship between the radio node and the selected at least one secondary node.

In this approach, if the network side node configures the radio node to access the network with a wired node connected directly with the network over a wired link as a first-hop secondary node connected directly with the radio node (that is, configures one secondary node), then the optimum communication path configured by the network side node for the radio node will be a single-hop node communication path; and if the network side node configures the radio node to access the network with at least two secondary nodes, then the optimum communication path configured by the network side node for the radio node will be a multi-hop node communication path.

Taking a single-hop node communication path as an example, the network side node can search for wired backhaul nodes (e.g., small cells) around the radio node to access the network, selects such one of the nodes that has an optimum link quality with the radio node, and a wired backhaul link capable of carrying data transmitted by the radio node as a secondary node of the radio node, and configures the radio node, and the secondary node selected by the network side node for the radio node with a correspondence relationship between them. That is, the network side node selects the appropriate secondary node for the radio node to access the network by measuring in advance to thereby establish such a communication path between the radio node, the secondary node, and the network side node that is superior in transmission efficiency and delay to a direct radio path between the radio node and the network side node, and notifies the radio node and the secondary node selected by the network side node for the radio node of the correspondence relationship between them, so that the radio node, and the secondary node selected by the network side node for the radio node can subsequently operate to exchange data and signaling.

In an approach B, the network side node determines the optimum communication path between the radio node to access the network, and the network according to obtained information about an access of the radio node to the network.

This approach further includes the following three approaches:

In an approach B1, the network side node configures the radio node to access the network with the at least one secondary node according to first measurement results reported by the radio node, particularly as described in the approach 31 above.

In this approach, particularly in the operation 61, the network side node receives the first measurement results reported by the radio node to access the network, selects those nodes satisfying a preset condition from the respective nodes located around the radio node and capable of providing another node with a data forwarding service according to the received first measurement results, determines the secondary nodes in the optimum communication path between the radio node and the network according to paths between the selected respective nodes and the network, and notifies the radio node and the respective secondary nodes determined, where the first measurement results are obtained by the radio node to access the network measuring respectively signals transmitted by the respective nodes around the radio node with a function capable of providing another node with a data forwarding service.

In this approach, if the network side node selects for the radio node to access the network a wired node connected directly with the network over a wired connection as a first-hop secondary node connected directly with the radio node (that is, selects one secondary node), then the optimum communication path between the radio network and the network will be a single-hop node communication path; and if the network side node selects at least two secondary nodes for the radio node to access the network, then the optimum communication path between the radio network and the network will be a multi-hop node communication path.

In an approach B2, the network side node configures the radio node to access the network with the at least one secondary node according to a second measurement result reported by at least one node around the radio node, particularly as described in the approach 32 above.

In this approach, particularly in the operation 61, the network side node receives the second measurement result reported by the at least one node around the radio node to access the network with a function capable of providing another node with a data forwarding service, selects those nodes satisfying a preset condition from the respective nodes reporting the second measurement results according to the received second measurement results, determines the secondary nodes in the optimum communication path between the radio node and the network according to paths between the selected respective nodes and the network, and notifies the radio node and the respective secondary nodes determined, where the second measurement results are obtained by the nodes, around the radio node to access the network with a function capable of providing another node with a data forwarding service, measuring a detecting signal transmitted by the radio node.

In this approach, if the network side node configures the radio node to access the network with a wired node connected directly with the network over a wired link as a first-hop secondary node connected directly with the radio node (that is, configures one secondary node), then the optimum communication path between the radio node and the network will be a single-hop node communication path; and if the network side node configures the radio node to access the network with at least two secondary nodes, then the optimum communication path between the radio node and the network will be a multi-hop node communication path.

In an approach B3, the network side node determines the optimum communication path between the radio node to access the network, and the network upon reception of a second request message transmitted by at least one node around the radio node with a function capable of providing another node with a data forwarding service, particularly as described in the approach 33 above.

In this approach, particularly in the operation 61, the network side node receives the second request message transmitted by the at least one node around the radio node to access the network with a function capable of providing another node with a data forwarding service, selects those nodes satisfying a preset condition from the respective nodes transmitting the second request messages, determines the secondary nodes in the optimum communication path between the radio node and the network according to paths between the selected respective nodes and the network, and notifies the radio node and the respective nodes determined, where the second request messages notify the network side node that the nodes transmitting the second request messages are capable of acting as secondary nodes for the radio node to access the network.

Of course, as an alternative to the approaches above, if the radio node to access the network determines the optimum communication path between the radio node and the network, then the network side node will determine the optimum communication path between the radio node and the network as follows: the network side node receives the optimum communication path between the radio node to access the network, and the network, determined by the radio node, notified of by the radio node, and determines the optimum communication path between the radio node and the network; or the network side node receives the optimum communication path between the radio node to access the network, and the network, notified of by the first-hop secondary node selected by the radio node, and determines the optimum communication path between the radio node and the network; or the network side node is notified by the first-hop secondary node selected by the radio node to access the network that the radio node accesses the network over a path established between the first-hop secondary node and the network, and determines the optimum communication path between the radio node and the network.

Further to any one of the approaches above, the preset condition as referred to in the embodiment of the invention includes at least one of:

There is an optimum link quality between the node and the radio node;

The link quality between the node and the radio node is above a preset quality threshold;

Data transmitted by the radio node can be carried over a backhaul link of the node;

There is the shortest transmission delay over the backhaul link of the node;

The transmission delay over the backhaul link of the node is below a preset delay threshold;

A transmission rate over the backhaul link of the node is no less than a wireless interface rate;

There is the shortest transmission delay over a link between the node and the radio node;

The transmission delay over the link between the node and the radio node is below a preset delay threshold;

There is the highest transmission rate over the link between the node and the radio node; and The transmission rate over the link between the node and the radio node is above a preset rate threshold.

Further to any one of the embodiments above, in an embodiment, the method further includes: the network side node configures a resource for communication between nodes connected directly in the optimum communication path between the radio node to access the network and the network, particularly in the following three approaches:

In a first approach, the network side node pre-configures the resource for communication between the nodes connected directly in the optimum communication path between the radio node to access the network and the network, and configures the resource to the radio node, and the at least one secondary node in the optimum communication path, particularly as described in the first approach above.

In a second approach, the network side node reconfigures an available resource for communication between the nodes connected directly in the optimum communication path of the radio node to access the network according to a current resource use condition of the network, and configures the resource to the radio node, and the at least one secondary node in the optimum communication path via resource configuration information, particularly as described in the second approach above.

In a third approach, the network side node configures a resource for communication between the nodes connected directly in the optimum communication path of the radio node to access the network according to a current resource use condition of the network, and the amounts of data to be transmitted by the respective nodes in the optimum communication path, and configures the resource to the radio node, and the at least one secondary node in the optimum communication path via resource configuration information, particularly as described in the third approach above.

Further to any one of the three approaches above, if the optimum communication path is a single-hop node communication path, then the nodes connected directly in the optimum communication path will be the radio node to access the network, and the first-hop secondary node connected directly therewith; and if the optimum communication path is a multi-hop node communication path, then the nodes connected directly in the optimum communication path will be the radio node to access the network and the first-hop secondary node connected directly therewith, the first-hop secondary node and a second-hop secondary node connected directly therewith, and an on. If the optimum communication path is a multi-hop node communication path in which the path established between the first-hop secondary node connected directly with the radio node to access the network, and the network is used, then the network side node can configure a new resource for communication the respective nodes connected directly in the path established between the first-hop secondary node and the network, or can instruct the respective nodes connected directly in the path established between the first-hop secondary node and the network to communicate over an existing resource of the path.

It shall be noted that the three approaches can be applied separately or in combination, for example, firstly a resource can be configured statically for the optimum communication path in the first approach, and then a resource can be reconfigured for the optimum communication path in the second approach or the third approach.

Further to any one of the embodiments above, the method further includes:

If the network side node needs to transmit downlink data to the radio node to access the network, then the network side will determine the first-hop secondary node connected directly with the radio node in the optimum communication path of the radio node, and transmit the downlink data to the first-hop secondary node over a channel between the first-hop secondary node and the network so that the first-hop secondary node forwards the downlink data to the corresponding radio node.

In this approach, the radio node to access the network is addressed by proxying a channel as follows: the network side node establishing a connection with the radio node to access the network stores the optimum communication path of the radio node, and thus determines that all the data of the radio node need to be forwarded by the secondary node. All the downlink data transmitted by the network side node to the radio node are firstly transmitted to the secondary node connected directly with the network side in the optimum communication path of the radio node, and forwarded by the secondary node in the optimum communication path to the radio node. Uplink data of the radio node is firstly transmitted by the radio node to the first-hop secondary node connected directly with the radio node in the optimum communication path, and forwarded by the first-hop secondary node to the network side node over the optimum communication path.

Further to any one of the embodiments above, the method further includes:

The network side node determines again an optimum communication path between the radio node to access the network, and the network upon reception of a notification message transmitted by the first-hop secondary node connected directly with the radio node in the optimum communication path, where the notification message notifies the network side node that the first-hop secondary node is not capable of continuing with providing the radio node with a data forwarding service.

The process flows of the methods above can be performed in software program which can be stored in a storage medium, and the stored software program can perform the operations of the methods above upon being invoked.

Figure 7:
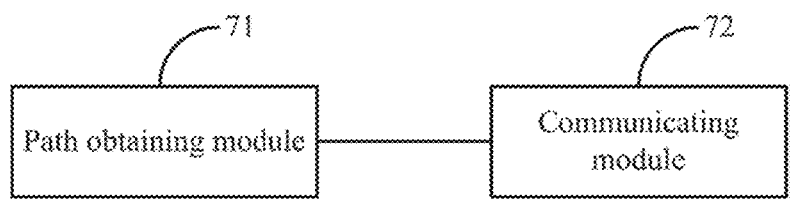
FIG. 7 is a schematic diagram of a radio node according to an embodiment of the invention.

Based upon the same inventive idea, an embodiment of the invention farther provides a radio node as illustrated in FIG. 7, where the radio node includes:

A path obtaining module 71 is configured, if the radio node including the path obtaining module 71 needs to access a network, to obtain an optimum communication path between the radio node and the network; and A communicating module 72 is configured to communicate with the network over the optimum communication path obtained by the path obtaining module 71;

Where the radio node is instructed over the optimum communication path to access the network through at least one secondary node, and at least one of the at least one secondary node is a wired node connected directly with the network.

The radio node according to the embodiment of the invention may be a radio node newly deployed in the network, or if a radio node deployed in the network needs to access the network again, then the radio node will be instructed over an optimum communication path obtained by the radio node to access the network through at least one secondary node, that is, the radio node will be instructed over the optimum communication path to communicate with a network side node (e.g., a macro station) through the at least one secondary node.

The secondary node as referred to in the embodiment of the invention is a node at least which has a function capable of providing another node with a data forwarding service, and which has the function enabled.

Here the secondary node may be a wired backhaul connected node (i.e., a wired node, e.g., a wired cell), or may be a radio backhaul connected node (i.e., a radio node, e.g., a radio cell), but at least one of the at least one secondary node involved in the optimum communication path obtained by the radio node is a wired node connected directly with the network.

It shall be noted that data and signaling are transmitted between a wired node among the at least one secondary node in the optimum communication path obtained by the path obtaining module 71, and the network side node (e.g., the macro station) in a wired transmission protocol; and if the at least one secondary node includes a radio node, then the radio node among the at least one secondary node will also obtain communication paths between the radio node and the network side node, and select an optimum communication path for communication with the network side node, where the radio node among the at least one secondary node can communicate with the network side node over a path established between the radio node and the network, or can reselect at least one secondary node for an access to the network.

In an implementation, the path obtaining module 71 is configured:

To select one of nodes around the radio node including the path obtaining module 71 with a function capable of providing another node with a data forwarding service as a first-hop secondary node through which the radio node accesses the network, and which is connected directly with the radio node, and to determine the optimum communication path between the radio node and the network as accessing the network through the first-hop secondary node, particularly as described in the first approach above, a repeated description of which will be omitted here;

Or

To determine the at least one secondary node in the optimum communication path between the radio node including the path obtaining module 71 and the network according to a preconfigured correspondence relationship between the radio node and the secondary node, and to determine the optimum communication path between the radio node and the network as accessing the network through the at least one secondary node, particularly as described in the second approach above, a repeated description of which will be omitted here;

Or

To receive the at least one secondary node, notified of by the network side node, selected by the network side node for the radio node including the path obtaining module 71, and to determine the optimum commutation path between the radio node and the network as accessing the network through the at least one secondary node, where the network side node determines the optimum commutation path between the radio node and the network according to obtained information about an access of the radio node to the network, particularly as described in the third approach above, a repeated description of which will be omitted here.

The first-hop secondary node in the optimum commutation path determined in any one of the approaches above can alternatively be a macro station.

In an embodiment of the invention, the path obtaining module 71 configured to select one of the nodes around the radio node including the path obtaining module 71 with a function capable of providing another node with a data forwarding service as the first-hop secondary node through which the radio node accesses the network, and which is connected directly with the radio node is configured:

To select a node satisfying a preset condition from the nodes around the radio node including the path obtaining module 71 with a function capable of providing another node with a data forwarding service as the first-hop secondary node through which the radio node accesses the network, and which is connected directly with the radio node, particularly as described in the approach 11 above, a repeated description of which will be omitted here; or To transmit a first request message to the nodes around the radio node including the path obtaining module 71 with a function capable of providing another node with a data forwarding service, and to select one of the nodes as the first-hop secondary node through which the radio node accesses the network, and which is connected directly with the radio node, according to a received first response message returned by the at least one node around the radio node with a function capable of providing another node with a data forwarding service, where the first request message requests for an access to the network through the node receiving the first request message, and the first response message notifies the radio node to access the network of whether the node transmitting the first response message is capable of acting as a secondary node for the radio node to access the network, particularly as described in the approach 12 above, a repeated description of which will be omitted here.

It shall be noted that after the path obtaining module 71 determines the optimum communication path between the radio node including the path obtaining module 71, and the network, the path obtaining module 71 can notify the network side node of the optimum communication path; or the first-hop secondary node selected by the path obtaining module 71 can notify the network side node of the optimum communication path, or the first-hop secondary node can notify the network side node that the radio node accesses the network over the path established between the first-hop secondary node and the network.

In an embodiment, the path obtaining module 71 is further configured:

Before the at least one secondary node, notified of by the network side node, selected by the network side node for the radio node including the path obtaining module 71 is received, to measure signals transmitted by the nodes around the radio node with a function capable of providing another node with a data forwarding service, and to report measured first measurement results to the network side node to request the network side node for determining the optimum communication path for the radio node; or Before the at least one secondary node, notified of by the network side node, selected by the network side node for the radio node including the path obtaining module 71 is received, to measure signals transmitted by the nodes around the radio node with a function capable of providing another node with a data forwarding service, and to report those first measurement results satisfying a preset threshold among measured first measurement results to the network side node to request the network side node for determining the optimum communication path for the radio node.

Further to any one of the embodiments above, the path obtaining module 71 configured to determine the nodes around the radio node with a function capable of providing another node with a data forwarding service is configured:

To determine that any one node transmitting indication information has a function capable of providing another node with a data forwarding service, upon reception of a message carrying the indication information transmitted by the node, where the indication information indicates that the node has a function capable of providing another node with a data forwarding service; or To transmit a first message to the respective nodes around the radio node, and to determine that any one node transmitting a second message has a function capable of providing another node with a data forwarding service, upon reception of the second message returned by the node, where the first message requests for the second messages to be returned by those nodes with a function capable of providing another node with a data forwarding service among the respective nodes around the radio node.

Furthermore the path obtaining module 71 is further configured:

Before the at least one secondary node, notified of by the network side node, selected by the network side node for the radio node including the path obtaining module 71 is received, to transmit a detecting signal to the nodes around the radio node, where the nodes around the radio node measure the detecting signal upon reception of the detecting signal, and report measured second measurement results, or those second measurement results satisfying a preset threshold among the measured second measurement results to the network side node to request the network side node for determining the optimum communication path for the radio node; or Before the at least one secondary node, notified of by the network side node, selected by the network side node for the radio node including the path obtaining module 71 is received, to transmit a first request message to the nodes around the radio node with a function capable of providing another node with a data forwarding service, where the first request message requests for an access to the network through the nodes receiving the first request message, and if the nodes receiving the first request message determine that they are capable of acting as secondary nodes for the radio node to access the network, then the nodes transmit second request messages to the network side node, where the second request messages notify the network side node that the nodes transmitting the second request messages are capable of acting as secondary nodes for the radio node to access the network.

Further to any one of the embodiments above, the communicating module 72 is configured:

To obtain from information preconfigured by the network side node a resource configured by the network side for communication between the radio node including the communicating module 72, and the first-hop secondary node connected directly therewith in the optimum communication path, and to communicate with the first-hop secondary node over the resource configured by the network side node, particularly as described in the first approach above, a repeated description of which will be omitted here; or To receive resource configuration information transmitted by the network side node, to obtain a resource configured by the network side node for communication between the radio node including the communicating module 72, and the first-hop secondary node connected directly therewith in the optimum communication path, and to communicate with the first-hop secondary node over a resource reconfigured by the network side node, particularly as described in the second approach above, a repeated description of which will be omitted here; or To report the amount of data to be transmitted by the radio node including the communicating module 72, to the network side node; and to receive resource configuration information transmitted by the network side node, to obtain a resource configured by the network side node for current communication between the radio node and the first-hop secondary node connected directly therewith in the optimum communication path, and to transmit the data to be transmitted, to the first-hop secondary node over the resource configured by the network side node, particularly as described in the third approach above, a repeated description of which will be omitted here; or To determine a resource for use in communication with the first-hop secondary node connected directly with the radio node including the communicating module 72 in the optimum communication path, by negotiating with the first-hop secondary node, particularly as described in the fourth approach above, a repeated description of which will be omitted here, Further to any one of the embodiments above, the communicating module 72 is configured:

To transmit uplink data be transmitted to the network side node, to the first-hop secondary node connected directly with the radio node including the communicating module 72 in the optimum communication path, where the first-hop secondary node transmits the uplink data to the corresponding network side node over a channel between the first-hop secondary node and the network according to a locally stored mapping relationship between the channel of the first-hop secondary node to the network, and a channel of the first-hop secondary node to the radio node; and To receive downlink data, from the network side node, transmitted by the first-hop secondary node connected directly with the radio node including the communicating module 72 in the optimum communication path, where the first-hop secondary node determines the radio node corresponding to the downlink data transmitted by the network according to the locally stored mapping relationship between the channel of the first-hop secondary node to the network, and a channel of the first-hop secondary node to the radio node, and forwards the downlink data to the radio node determined, upon reception of the downlink data.

Further to any one of the embodiments above, the path obtaining module 71 is further configured:

If it is determined that a link quality between the radio node including the path obtaining module 71, and the first-hop secondary node connected directly with the radio node in the optimum communication path is below a preset threshold, to disconnect the radio node from the first-hop secondary node, and to reselect a new optimum communication path for an access to the network; or If a notification message transmitted by the first-hop secondary node connected directly with the radio node including the path obtaining module 71 in the optimum communication path is received, to disconnect the radio node from the first-hop secondary node, and to reselect a new optimum communication path for an access to the network, where the notification message notifies the radio node that the first-hop secondary node is not capable of continuing with providing the radio node with a data forwarding service.

Figure 8:
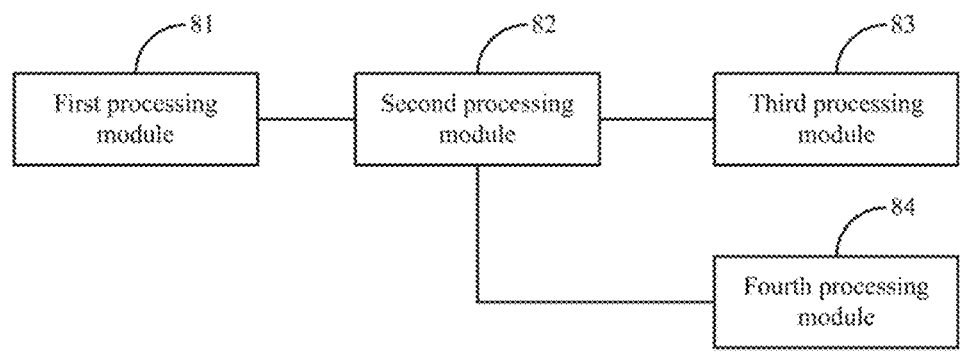
FIG. 8 is a schematic diagram of a network side node according to an embodiment of the invention.

Based upon the same inventive idea, an embodiment of the invention further provides a network side node as illustrated in FIG. 8, where the network side node includes:

A first processing module 81 is configured to determine any one radio node to access a network; and A second processing module 82 is configured to determine an optimum communication path between the radio node and the network, where the radio node is instructed over the optimum communication path to communicate with the network through at least one secondary node, and at least one of the at least one secondary node is a wired node connected directly with the network.

The network side node in the embodiment of the invention can be an entity functioning for OAM, a macro station, or a network side control node, e,g., an MME, an SGW, a PGW, etc.

In an embodiment, the second processing module 82 is configured:

To select those nodes satisfying a preset condition from the respective nodes located around the radio node and capable of providing another node with a data forwarding service, by measuring in advance, to determine the at least one secondary node in the optimum communication path between the radio node and the network according to paths between the selected respective nodes and the network, and to configure the radio node and the selected respective secondary nodes respectively with a correspondence relationship between the radio node and the selected at least one secondary node, particularly as described in the approach A above, a repeated description of which will be omitted here;

Or

To determine the optimum communication path between the radio node and the network according to obtained information about an access of the radio node to the network, particularly as described in the approach B above, a repeated description of which will be omitted here.

Furthermore the second processing module 82 configured to determine the optimum communication path between the radio node and the network according to the obtained information about an access of the radio node to the network is configured:

To receive first measurement results reported by the radio node, to select those nodes satisfying a preset condition from the respective nodes located around the radio node and capable of providing another node with a data forwarding service according to the received first measurement results, to determine the secondary nodes in the optimum communication path between the radio node and the network according to paths between the selected respective nodes and the network, and to notify the radio node and the respective secondary nodes determined, where the first measurement results are obtained by the radio node measuring respectively signals transmitted by the respective nodes around the radio node with a function capable of providing another node with a data forwarding service, particularly as described in the approach B1 above, a repeated description of which will be omitted here; or To receive a second measurement result reported by at least one node around the radio node to access the network with a function capable of providing another node with a data forwarding service, to select those nodes satisfying a preset condition from the respective nodes reporting the second measurement results according to the received second measurement results, to determine the secondary nodes in the optimum communication path between the radio node and the network according to paths between the selected respective nodes and the network, and to notify the radio node and the respective secondary nodes determined, where the second measurement results are obtained by the nodes, around the radio node to access the network with a function capable of providing another node with a data forwarding service, measuring a detecting signal transmitted by the radio node, particularly as described in the approach B2 above, a repeated description of which will be omitted here; or To receive a second request message transmitted by at least one node around the radio node to access the network with a function capable of providing another node with a data forwarding service, to select those nodes satisfying a preset condition from the respective nodes transmitting the second request messages, to determine the secondary nodes in the optimum communication path between the radio node and the network according to paths between the selected respective nodes and the network, and to notify the radio node and the respective nodes determined, where the second request messages notify the network side node that the nodes transmitting the second request messages are capable of acting as secondary nodes for the radio node to access the network, particularly as described in the approach B3 above, a repeated description of which will be omitted here.

Of course, as an alternative to the approaches above, if the radio node to access the network determines the optimum communication path between the radio node and the network, then the second processing module 82 configured to determine the optimum communication path between the radio node and the network is configured: to receive the optimum communication path between the radio node to access the network, and the network, determined by the radio node, notified of by the radio node, and to determine the optimum communication path between the radio node and the network; or to receive the optimum communication path between the radio node to access the network, and the network, notified of by a first-hop secondary node selected by the radio node, and to determine the optimum communication path between the radio node and the network; or to be notified by the first-hop secondary node selected by the radio node to access the network that the radio node accesses the network over a path established between the first-hop secondary node and the network, and to determine the optimum communication path between the radio node and the network.

Further to any one of the embodiments above, the network side node further includes a third processing module 83 configured:

To pre-configure a resource for communication between nodes connected directly in the optimum communication path, and to configure the resource to the radio node, and the at least one secondary node in the optimum communication path, particularly as described in the first approach above, a repeated description of which will be omitted here; or To reconfigure an available r source for communication between nodes connected directly in the optimum communication path according to a current resource use condition of the network, and to configure the resource to the radio node, and the at least one secondary node in the optimum communication path via resource configuration information, particularly as described in the second approach above, a repeated description of which will be omitted here; or To configure a resource for communication between nodes connected directly in the optimum communication path according to a current resource use condition of the network, and the amounts of data to be transmitted by the respective nodes in the optimum communication path, and to configure the resource to the radio node, and the at least one secondary node in the optimum communication path via resource configuration information, particularly as described in the third approach above, a repeated description of which will be omitted here.

It shall be noted that the three approaches can be applied separately or in combination, for example, firstly a resource can be configured statically for the optimum communication path in the first approach, and then a resource can be reconfigured for the optimum communication path in the second approach or the third approach.

Further to any one of the embodiments above, the network side node further includes a fourth processing module 84 configured:

If downlink data need to be transmitted to the radio node, to determine the first-hop secondary node connected directly with the radio node in the optimum communication path, and to transmit the downlink data to the first-hop secondary node over a channel between the first-hop secondary node and the network so that the first-hop secondary node forwards the downlink data to the radio node.

Further to any one of the embodiments above, the second processing module 82 is further configured:

To determine again an optimum communication path between the radio node and the network upon reception of a notification message transmitted by the first-hop secondary node connected directly with the radio node in the optimum communication path, where the notification message notifies the network side node that the first-hop secondary node is not capable of continuing with providing the radio node with a data forwarding service.

Figure 9:
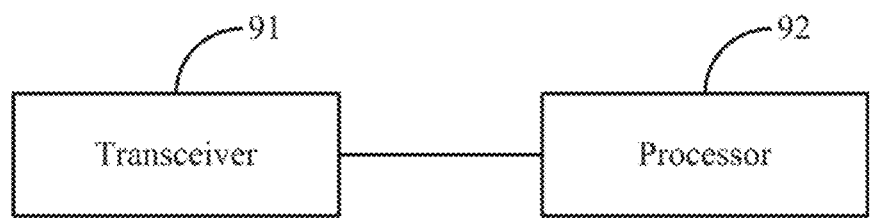
FIG. 9 is a schematic diagram of another radio node according to an embodiment of the invention.

The structure of and processing by a radio node to access a network according to an embodiment of the will be described below in connection with a preferred hardware structure thereof As illustrated in FIG. 9, the radio node includes a transceiver 91, and at least one processor 92 connected with the transceiver 91, where:

The processor 92 is configured, if the radio node including the processor 92 needs to access a network, to obtain an optimum communication path between the radio node and the network; and to communicate with the network over the obtained optimum communication path;

Where the radio node is instructed over the optimum communication path to access the network through at least one secondary node, and at least one of the at least one secondary node is a wired node connected directly with the network.

It shall be noted that data and signaling are transmitted between a wired node among the at least one secondary node in the optimum communication path obtained by the processor 92, and the network side node (e.g., the macro station) in a wired transmission protocol; and if the at least one secondary node includes a radio node, then the radio node among the at least one secondary node will also obtain communication paths between the radio node and the network side node, and select an optimum communication path for communication with the network side node, where the radio node among the at least one secondary node can communicate with the network side node over a path established between the radio node and the network, or can reselect at least one secondary node for an access to the network.

In an embodiment, the processor 92 is configured:

To select one of nodes around the radio node including the processor 92 with a function capable of providing another node with a data forwarding service as a first-hop secondary node through which the radio node accesses the network, and which is connected directly with the radio node, and to determine the optimum communication path between the radio node and the network as accessing the network through the first-hop secondary node, particularly as described in the first approach above, a repeated description of which will be omitted here;

Or

To determine the at least one secondary node in the optimum communication path between the radio node including the processor 92 and the network according to a preconfigured correspondence relationship between the radio node and the secondary node, and to determine the optimum communication path between the radio node and the network as accessing the network through the at least one secondary node, particularly as described in the second approach above, a repeated description of which will be omitted here;

Or

To receive through the transceiver 91 the at least one secondary node, notified of by the network side node, selected by the network side node for the radio node including the processor 92, and to determine the optimum commutation path between the radio node and the network as accessing the network through the at least one secondary node, wherein the network side node determines the optimum commutation path between the radio node and e network according to obtained information about an access of the radio node to the network, particularly as described in the third approach above, a repeated description of which will be omitted here.

The first-hop secondary node in the optimum commutation path determined in any one of the approaches above can alternatively be a macro station.

In an embodiment of the invention, the processor 92 configured to select one of the nodes around the radio node including the processor 92 with a function capable of providing another node with a data forwarding service as the first-hop secondary node through which the radio node accesses the network, and which is connected directly with the radio node is configured:

To select a node satisfying a preset condition from the nodes around the radio node including the processor 92 with a function capable of providing another node with a data forwarding service as the first-hop secondary node through which the radio node accesses the network, and which is connected directly with the radio node particularly as described in the approach 11 above, a repeated description of which will be omitted here; or To trigger the transceiver 91 to transmit a first request message to the nodes around the radio node including the processor 92 with a function capable of providing another node with a data forwarding service, and to select one of the nodes as the first-hop secondary node through which the radio node accesses the network, and which is connected directly with the radio node, according to a first response message, received through the transceiver 91, returned by the at least one node around the radio node with a function capable of providing another node with a data forwarding service, where the first request message requests for an access to the network through the node receiving the first request message, and the first response message notifies the radio node to access the network of whether the node transmitting the first response message is capable of acting as a secondary node for the radio node to access the network, particularly as described in the approach 12 above, a repeated description of which will be omitted here.

It shall be noted that after the processor 92 determines the optimum communication path between the radio node including the processor 92, and the network, the processor 92 can trigger the transceiver 91 to notify the network side node of the optimum communication path; or the first-hop secondary node selected by the processor 92 can notify the network side node of the optimum communication path, or the first-hop secondary node can notify the network side node that the radio node accesses the network over the path established between the first-hop secondary node and the network.

In an embodiment, the processor 92 is further configured:

Before the transceiver 91 receives the at least one secondary node, notified of by the network side node, selected by the network side node for the radio node including the transceiver 91, to measure signals transmitted by the nodes around the radio node with a function capable of providing another node with a data forwarding service, and to trigger the transceiver 91 to report measured first measurement results to the network side node to request the network side node for determining the optimum communication path for the radio node; or Before the transceiver 91 receives the at least one secondary node, notified of by the network side node, selected by the network side node for the radio node including the transceiver 91, to measure signals transmitted by the nodes around the radio node with a function capable of providing another node with a data forwarding service, and to trigger the transceiver 91 to report those first measurement results satisfying a preset threshold among measured first measurement results to the network side node to request the network side node for determining the optimum communication path for the radio node.

Further to any one of the embodiments above, the processor 92 configured to determine the nodes around the radio node with a function capable of providing another node with a data forwarding service is configured:

To determine that any one node transmitting indication information has a function capable of providing another node with a data forwarding service, after the transceiver 91 receives a message carrying the indication information transmitted by the node, where the indication information indicates that the node has a function capable of providing another node with a data forwarding service; or To determine that any one node transmitting a second message has a function capable of providing another node with a data forwarding service, if the transceiver 91 receives the second message returned by the node, where the transceiver 91 transmits a first message to the respective nodes around the radio node, and the first message requests for the second messages to be returned by those nodes with a function capable of providing another node with a data forwarding service among the respective nodes around the radio node.

Furthermore the processor 92 is further configured:

Before the at least one secondary node, notified of by the network side node, selected by the network side node for the radio node including the processor 92 is received, to transmit a detecting signal to the nodes around the radio node, where the nodes around the radio node measure the detecting signal upon reception of the detecting signal, and report measured second measurement results, or those second measurement results satisfying a preset threshold among the measured second measurement results to the network side node to request the network side node for determining the optimum communication path for the radio node; or Before the at least one secondary node, notified of by the network side node, selected by the network side node for the radio node including the processor 92 is received, o transmit a first request message to the nodes around the radio node with a function capable of providing another node with a data forwarding service, wherein the first request message requests for an access to the network through the nodes receiving the first request message, and if the nodes receiving the first request message determine that they are capable of acting as secondary nodes for the radio node to access the network, then the nodes transmit second request messages to the network side node, wherein the second request messages notify the network side node that the nodes transmitting the second request messages are capable of acting as secondary nodes for the radio node to access the network.

Further to any one of the embodiments above, the processor 92 is configured:

To obtain from information preconfigured by the network side node a resource configured by the network side for communication between the radio node including the processor 92, and a first-hop secondary node connected directly therewith in the optimum communication path, and to communicate with the first-hop secondary node over the resource configured by the network side node, particularly as described in the first approach above, a repeated description of which will be omitted here; or To obtain a resource configured by the network side node for communication between the radio node including the processor 92, and the first-hop secondary node connected directly therewith in the optimum communication path according to resource configuration information, transmitted by the network side node, received by the transceiver 91, and to communicate with the first-hop secondary node over a resource reconfigured by the network side node, particularly as described in the second approach above, a repeated description of which will be omitted here; or To obtain a resource configured by the network side node for current communication between the radio node and the first-hop secondary node connected directly therewith in the optimum communication path according to resource configuration information, transmitted by the network side node, received by the transceiver 91, and to transmit data to he transmitted, to the first-hop secondary node over the resource configured by the network side node, wherein the transceiver 91 reports the amount of data to be transmitted by the radio node including the transceiver 91, to the network side node, particularly as described in the third approach above, a repeated description of which will be omitted here; or To determine a resource for use in communication with the first-hop secondary node connected directly with the radio node including the processor 92 in the optimum communication path, by negotiating with the first-hop secondary node, particularly as described in the fourth approach above, a repeated description of which will be omitted here.

Figure 10:
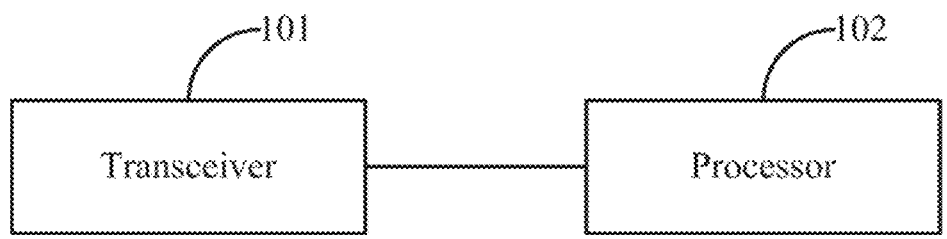
FIG. 10 is a schematic diagram of another network side node according to an embodiment of the invention.

Further to any one of the embodiments above, the transceiver 91 is configured:

To transmit uplink data to be transmitted to the network side node, to the first-hop secondary node connected directly with the radio node including the transceiver 91 in the optimum communication path, where the first-hop secondary node transmits the uplink data to the corresponding network side node over a channel between the first-hop secondary node and the network according to a locally stored mapping relationship between the channel of the first-hop secondary node to the network, and a channel of the first-hop secondary node to the radio node; and To receive downlink data, from the network side node, transmitted by the first-hop secondary node connected directly with the radio node including the transceiver 91 in the optimum communication path, where the first-hop secondary node determines the radio node corresponding to the downlink data transmitted by the network according to the locally stored mapping relationship between the channel of the first-hop secondary node to the network, and a channel of the first-hop secondary node to the radio node, and forwards the downlink data to the radio node determined, upon reception of the downlink data, Further to any one of the embodiments above, the processor 92 is further configured:

If it is determined that a link quality between the radio node including the processor 92, and the first-hop secondary node connected directly with the radio node in the optimum communication path is below a preset threshold, to disconnect the radio node from the first-hop secondary node, and to reselect a new optimum communication path for an access to the network; or If the transceiver 91 receives a notification message transmitted by the first-hop secondary node connected directly with the radio node including the transceiver 91 in the optimum communication path, to disconnect the radio node from the first-hop secondary node, and to reselect a new optimum communication path for an access to the network, wherein the notification message notifies the radio node that the first-hop secondary node is not capable of continuing with providing the radio node with a data forwarding service, The structure of and processing by a network side node according to an embodiment of the will be described below in connection with a preferred hardware structure thereof, As illustrated in FIG. 10, the network side node includes a transceiver 101, and at least one processor 102 connected with the transceiver 101, where:

The processor 102 is configured to determine any one radio node to access a network; and to determine an optimum communication path between the radio node and the network, wherein the radio node is instructed over the optimum communication path to communicate with the network through at least one secondary node, and at least one of the at least one secondary node is a wired node connected directly with the network.

The network side node in the embodiment of the invention can be an entity functioning for OAM, a macro station, or a network side control node, e.g., an MME, SGW, a PGW, etc.

In an embodiment, the processor 102 is configured:

To select those nodes satisfying a preset condition from the respective nodes located around the radio node and capable of providing another node with a data forwarding service, by measuring in advance, to determine the at least one secondary node in the optimum communication path between the radio node and the network according to paths between the selected respective nodes and the network, and to configure the radio node and the selected respective secondary nodes respectively with a correspondence relationship between the radio node and the selected at least one secondary node, particularly as described in the approach A above, a repeated description of which will be omitted here;

Or

To determine the optimum communication path between the radio node and the network according to obtained information about an access of the radio node to the network, particularly as described in the approach B above, a repeated description of which will be omitted here.

Furthermore the processor 102 configured to determine the optimum communication path between the radio node and the network according to the obtained information about an access of the radio node to the network is configured:

To select those nodes satisfying a preset condition from the respective nodes located around the radio node and capable of providing another node with a data forwarding service according to first measurement results, reported by the radio node, received by the transceiver 101, to determine the secondary nodes in the optimum communication path between the radio node and the network according to paths between the selected respective nodes and the network, and to notify the radio node and the respective secondary nodes determined, where the first measurement results are obtained by the radio node measuring respectively signals transmitted by the respective nodes around the radio node with a function capable of providing another node with a data forwarding service, particularly as described in the approach B1 above, a repeated description of which will be omitted here; or To receive through the transceiver 101 a second measurement result reported by at least one node around the radio node to access the network with a function capable of providing another node with a data forwarding service, to select those nodes satisfying a preset condition from the respective nodes reporting the second measurement results, to determine the secondary nodes in the optimum communication path between the radio node and the network according to paths between the selected respective nodes and the network, and to notify the radio node and the respective secondary nodes determined, wherein the second measurement results are obtained by the nodes, around the radio node to access the network with a function capable of providing another node with a data forwarding service, measuring a detecting signal transmitted by the radio node, particularly as described in the approach B2 above, a repeated description of which will be omitted here; or To receive through the transceiver 101 a second request message transmitted by at least one node around the radio node to access the network with a function capable of providing another node with a data forwarding service, to select those nodes satisfying a preset condition from the respective nodes transmitting the second request messages, to determine the secondary nodes in the optimum communication path between the radio node and the network according to paths between the selected respective nodes and the network, and to notify the radio node and the respective nodes determined, wherein the second request messages notify the network side node that the nodes transmitting the second request messages are capable of acting as secondary nodes for the radio node to access the network, particularly as described in the approach 83 above, a repeated description of which will be omitted here.

Of course, as an alternative to the approaches above, if the radio node to access the network determines the optimum communication path between the radio node and the network, then the processor 102 configured to determine the optimum communication path between the radio node and the network is configured: to receive through the transceiver 101 the optimum communication path between the radio node to access the network, and the network, determined by the radio node, notified of by the radio node, and to determine the optimum communication path between the radio node and the network; or to receive through the transceiver 101 the optimum communication path between the radio node to access the network, and the network, notified of by a first-hop secondary node selected by the radio node, and to determine the optimum communication path between the radio node and the network; or to be notified through the transceiver 101 by the first-hop secondary node selected by the radio node to access the network that the radio node accesses the network over a path established between the first-hop secondary node and the network, and to determine the optimum communication path between the radio node and the network, Further to any one of the embodiments above, the processor 102 is further configured:

To pre-configure a resource for communication between nodes connected directly in the optimum communication path, and to configure the resource to the radio node, and the at least one secondary node in the optimum communication path, particularly as described in the first approach above, a repeated description of which will be omitted here; or To reconfigure an available resource for communication between nodes connected directly in the optimum communication path according to a current resource use condition of the network, and to configure the resource to the radio node, and the at least one secondary node in the optimum communication path via resource configuration information, particularly as described in the second approach above, a repeated description of which will be omitted here; or To configure a resource for communication between nodes connected directly in the optimum communication path according to a current resource use condition of the network, and the amounts of data to be transmitted by the respective nodes in the optimum communication path, and to configure the resource to the radio node, and the at least one secondary node in the optimum communication path via resource configuration information, particularly as described in the third approach above, a repeated description of which will be omitted here.

It shall be noted that the three approaches can be applied separately or in combination, for example, firstly a resource can be configured statically for the optimum communication path in the first approach, and then a resource can be reconfigured for the optimum communication path in the second approach or the third approach.

Further to any one of the embodiments above, the processor 102 is further configured:

If downlink data need to be transmitted to the radio node, to determine the first-hop secondary node connected directly with the radio node in the optimum communication path of the radio node, and to transmit the downlink data to the first-hop secondary node over a channel between the first-hop secondary node and the network an that the first-hop secondary node forwards the downlink data to the radio node.

Further to any one of the embodiments above, the processor 102 is further configured:

To determine again an optimum communication path between the radio node and the network after the transceiver 101 receives a notification message transmitted by the first-hop secondary node connected directly with the radio node in the optimum communication path, wherein the notification message notifies the network side node that the first-hop secondary node is not capable of continuing with providing the radio node with a data forwarding service.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for determining a communication path, the method comprising:
    obtaining, by a wireless station to access a wired network, information about a communication path between the wireless station and the wired network, wherein the wireless station comprises a base station of a small cell; and
    communicating, by the wireless station, with the wired network over the communication path according to the obtained information;

wherein:
the information indicates that the wireless station accesses the wired network through at least one forwarding node;
the at least one forwarding node is at least one node enabled to provide another device with a data forwarding service;
the wireless station communicates with a forwarding node next to the wireless station in the communication path wirelessly, wherein the forwarding node next to the wireless station is one of the at least one forwarding node;
the at least one forwarding node comprises at least one wired node
communicating with the wired network via a wired protocol; and
a last forwarding node of the at least one forwarding node is a non-fixed wired node, wherein the last forwarding node is next to the wired network;
wherein obtaining, by the wireless station to access the wired network, information about the communication path between the wireless station and the wired network comprises:
  selecting, by the wireless station, one of at least one node enabled to provide another device with the data forwarding service around the wireless station as a first-hop forwarding node in the communication path, and determining the information about the communication path between the wireless station and the wired network as accessing the wired network through the first-hop forwarding node; wherein the first-hop forwarding node is the forwarding node next to the wireless station in the communication path;
  or
  determining, by the wireless station, the at least one forwarding node in the communication path between the wireless station and the wired network according to a preconfigured correspondence relationship between the wireless station and the at least one forwarding node, and determining the information about the communication path between the wireless station and the wired network as accessing the wired network through the at least one forwarding node;
  or
  receiving, by the wireless station, from a wired network side node, information about the at least one forwarding node, selected by the wired network side node for the wireless station, and determining the information about the commutation path between the wireless station and the wired network as accessing the wired network through the at least one forwarding node, wherein the wired network side node determines the information about the commutation path between the wireless station and the wired network according to obtained information about accessing of the wireless station to the wired network, wherein the wired network side node comprises an entity functioning for Operation and Maintenance, OAM, a macro station and a network side control node;
wherein before the wireless station receives from the wired network side node the information about the at least one forwarding node, selected by the wired network side node for the wireless station the method further comprises:

measuring, by the wireless station, at least one signal transmitted by at least one node enabled to provide another device with the data forwarding a service around the wireless station, and reporting at least one measured first measurement result to the wired network side node to request the wired network side node for determining the information about the communication path for the wireless station; or
  measuring, by the wireless station, at least one signal transmitted by the at least one node enabled to provide another device with the data forwarding service around the wireless station, and reporting at least one first measurement result satisfying a preset threshold to the wired network side node to request the wired network side node for determining the information about the communication path for the wireless station; or
  transmitting, by the wireless station, a detecting signal to at least one node around the wireless station, wherein the at least one node measures the detecting signal upon reception of the detecting signal, and reports at least one measured second measurement results, or at least one second measurement result satisfying the preset threshold, to the wired network side node to request the wired network side node for determining the information about the communication path for the wireless station; or
  transmitting, by the wireless station, at least one first request message to the at least one node enabled to provide another device with the data forwarding service around the wireless station, wherein each of the at least one first request message requests for an access to the wired network through one of the at least one node, and when at least one node receiving at least one first request message determines that it is capable of acting as at least one forwarding node for the wireless station to access the wired network, the at least one node transmits at least one second request message to the wired network side node, wherein the at least one second request message informs the wired network side node that the at least one node, transmitting the at least one second request message, is capable of acting as at least one forwarding node for the wireless station to access the wired network;
wherein communicating, by the wireless station, with the wired network over the communication path according to the obtained information comprises:
  obtaining by the wireless station, a resource configured by a wired network side node for communication between the wireless station and a first-hop forwarding node according to information preconfigured by the wired network side node, and communicating with the first-hop forwarding node over the resource; wherein the first-hop forwarding node is the forwarding node next to the wireless station in the communication path; or
  receiving, by the wireless station, resource configuration information transmitted by the wired network side node, Obtaining a resource configured by the wired network side node for communication between the wireless station and the first-hop forwarding node in the communication path, and communicating with the first-hop forwarding node over the resource reconfigured by the wired network side node; or reporting, by the wireless station, the amount of data to be transmitted by the wireless station to the wired network side node; receiving resource configuration information transmitted by the wired network side node: obtaining a resource configured by the wired network side node for current communication between the wireless station and the first-hop forwarding node in the communication path, and transmitting the data to be transmitted to the first-hop forwarding node over the resource; or determining, by the wireless station, a resource for use in communication with the first-hop forwarding node in the communication path, by negotiating with the first-hop forwarding node; or transmitting, by the wireless station, uplink data to be transmitted to the wired network side node, to the first-hop forwarding node in the communication path, wherein the first-hop forwarding node transmits the uplink data to the wired network side node over a channel between the first-hop forwarding node and the wired network according to a locally stored mapping relationship between the channel of the first-hop forwarding node to the wired network, and a channel of the first-hop forwarding node to the wireless station; and receiving, by the wireless station, downlink data, from the wired network side node, forwarded by the first-hop forwarding node in the communication path, wherein upon reception of the downlink data transmitted by the wired network, the first-hop forwarding node determines the wireless station corresponding o the downlink data according to the locally stored mapping relationship between the channel of the first-hop forwarding node to the wired network, and the channel of the first-hop forwarding node to the wireless station, and forwards the downlink data to the determined wireless station.

2. The method according to claim 1, wherein selecting, by the wireless station, one of the at least one node enabled to provide another device with the data forwarding service around the wireless station as the first-hop forwarding node in the communication path comprises:

selecting, by the wireless station, a node satisfying a preset condition from the at least one node enabled to provide another device with the data forwarding service around the wireless station as the first-hop forwarding node; or transmitting, by the wireless station, at least one first request message to the at least one node enabled to provide another device with the data forwarding service around the wireless station, and selecting one of the at least one node as the first-hop forwarding node according to at least one received first response message returned by at least one node, wherein each of the at least one first request message requests for an access to the wired network through one of the at least one node, and each of the at least one first response message informs the wireless station whether a node transmitting the first response message is capable of acting as a forwarding node for the wireless station to access the wired network.

3. The method according to claim 1, wherein the wireless station determines the at least one node enabled to provide another device with the data forwarding service around the wireless station in one of following ways:

upon reception of at least one message carrying indication information transmitted by at least one node, determining, by the wireless station, that the at least one node transmitting the indication information is enabled to provide another device with the data forwarding service, wherein the indication information indicates that the at least one node is enabled to provide another device with the data forwarding service; or transmitting, by the wireless station, at least one first message to at least one node around the wireless station, and upon reception of at least one second message returned by at least one node, determining that at least one node transmitting the at least one second message is enabled to provide another device with the data forwarding service, wherein each of the at least one first message requests for one of the at least one second message to be returned by the at least one node enabled to provide another device with the data forwarding service around the wireless station.

4. The method according to claim 1, wherein the method further comprises:

when determining that quality of a link between the wireless station and a first-hop forwarding node in the communication path is below a preset threshold, disconnecting, by the wireless station, from the first-hop forwarding node, and reselecting a new communication path to access the wired network, wherein the first-hop forwarding node is the forwarding node next to the wireless station in the communication path; or when receiving a notification message transmitted by the first-hop forwarding node in the communication path, disconnecting, by the wireless station, from the first-hop forwarding node, and reselecting a new communication path to access the wired network, wherein the notification message informs the wireless station that the first-hop forwarding node is unable to continue providing the wireless station with the data forwarding service.

5. A wireless station, comprising:

a transceiver;

a processor; and a memory storing at least one instruction, wherein the processor is configured to execute the at least one instruction to:

obtain information about a communication path between the wireless station and a wired network when the wireless station needs to access the wired network, wherein the wireless station comprises a base station of a small cell; and control the transceiver to communicate with the wired network over the communication path according to the obtained information;

wherein:

the information indicates that the wireless station accesses the wired network through at least one forwarding node;

the at least one forwarding node is at least one node enabled to provide another device with a data forwarding service;

the wireless station communicates with a forwarding node next to the wireless station in the communication path wirelessly, wherein the forwarding node next to the wireless station is one of the at least one forwarding node;

the at least one forwarding node comprises at least one wired node communicating with the wired network via a wired protocol; and a last forwarding node of the at least one forwarding node is a non-fixed wired node, wherein the last forwarding node is next to the wired network;
wherein the processor is further configured to execute the at least one instruction to:
  select one of at least one node enabled to provide another device with the data forwarding service around the wireless station as a first-hop forwarding node in the communication path, and determine the information about the communication path between the wireless station and the wired network as accessing the wired network through the first-hop forwarding node; wherein the first-hop forwarding node is the forwarding node next to the wireless station in the communication path;
  or
  determine the at least one forwarding node in the communication path between the wireless station and the wired network according to a preconfigured correspondence relationship between the wireless station and the at least one forwarding node, and determine the information about the communication path between the wireless station and the wired network as accessing the wired network through the at least one forwarding node;
  or
  control the transceiver to receive, from a wired network side node, information about the at least one forwarding node, selected by the wired network side node for the wireless station, and determine the information about the commutation path between the wireless station and the wired network as accessing the wired network through the at least one forwarding node, wherein the wired network side node determines the information about the commutation path between the wireless station and the wired network according to obtained information about accessing of the wireless station to the wired network, wherein the wired network side node comprises an functioning for Operation and Maintenance, OAM, a macro station and a network side control node;
wherein before controlling the transceiver to receive from the wired network side node the information about the at least one forwarding node, selected by the wired network side node for the wireless station, the processor is further configured to execute the at least one instruction to:
  measure at least one signal transmitted by at least one node enabled to provide another device with the data forwarding service around the wireless station, and control the transceiver to report at least one measured first measurement result to the wired network side node to request the wired network side node for determining the information about the communication path for the wireless station; or
  measure at least one signal transmitted by the at least one node enabled to provide another device with the data forwarding service around the wireless station, and control the transceiver to report at least one first measurement result satisfying a preset threshold to the wired network side node to request the wired network side node for determining the information about the communication path for the wireless station; or
  control the transceiver to transmit a detecting signal to at least one node around the wireless station, wherein the at least one node measures the detecting signal upon reception of the detecting signal, and reports at least one measured second measurement result, or at least one second measurement result satisfying the preset threshold to the wired network side node to request the wired network side node for determining the information about the communication path for the wireless station; or
  control the transceiver to transmit at least one first request message to the at least one node enabled to provide another device with the data forwarding service around the wireless station, wherein each of the at least one first request message requests for an access to the wired network through one of the at least one node and when at least one node receiving at least one first request message determines that it is capable of acting as at least one forwarding node for the wireless station to access the wired network, the at least one node transmits at least one second request message to the wired network side node, wherein the at least one second request message informs the wired network side node that the at least one node, transmitting the at least one second request message, is capable of acting as at least one forwarding node for the wireless station to access the wired network;
wherein the processor is further configured to execute the at least one instruction to:
  obtain a resource configured by a wired network side node for communication between the wireless station and a first-hop forwarding node according to information preconfigured by the wired network side node, and control the transceiver to communicate with the first-hop forwarding node over the resource; wherein the first-hop forwarding node is the forwarding node next to the wireless station in the communication path; or
  control the transceiver to receive resource configuration information transmitted by the wired network side node, obtain a resource configured by the wired network side node for communication between the wireless station, and a first-hop forwarding node in the communication path, and control the transceiver to communicate with the first-hop forwarding node over the resource reconfigured by the wired network side node; or
  control the transceiver to report the amount of data to be transmitted by the wireless station to the wired network side node, and to receive resource configuration information transmitted by the wired network side node; obtain a resource configure d by the wired network side node for current communication between the wireless station and the first-hop forwarding node in the communication path; and control the transceiver to transmit the data to be transmitted to the first-hop forwarding node over the resource; or
  determine a resource for use in communication with the first-hop forwarding node in the communication path, by negotiating with the first-hop forwarding node; or
  control the transceiver to transmit uplink data to be transmitted to the wired network side node, to the first-hop forwarding node in the communication path, wherein the first-hop forwarding node transmits the uplink data to the wired network side node over a channel between the first-hop forwarding node and the wired network according to a locally stored mapping relationship between the channel of the first-hop forwarding node to the wired network, and a channel of the first-hop forwarding node to the wireless station; and control the transceiver to receive downlink data, from the wired network side node, forwarded by the first-hop forwarding node in the communication path, wherein upon reception of the downlink data transmitted by the wired network, the first-hop forwarding node determines the wireless station corresponding to the downlink data according to the locally stored mapping relationship between the channel of the first-hop forwarding node to the wired network, and the channel of the first-hop forwarding node to the wireless station, and forwards the downlink data to the determined wireless station.

6. The wireless station according to claim 5, wherein the processor is further configured to execute the at least one instruction to:
select a node satisfying a preset condition from the at least one node enabled to provide another device with the data forwarding service around the wireless station as the first-hop forwarding node; or
control the transceiver to transmit at least one first request message to the at least one node enabled to provide another device with the data forwarding service around the wireless station, and select one of the at least one node as the first-hop forwarding node according to at least one received first response message returned by at least one node, wherein each of the at least one first request message requests for an access to the wired network through one of the at least one node, and each of the at least one first response message informs the wireless station whether a node transmitting the first response message is capable of acting as a forwarding node for the wireless station to access the wired network.

7. The wireless station according to claim 5, wherein the processor is further configured to execute the at least one instruction to:

upon reception of at least one message carrying indication information transmitted by at least one node, determine that the at least one node transmitting the indication information is enabled to provide another device with the data forwarding service, wherein the indication information indicates that the at least one node is enabled to provide another device with the data forwarding service; or
control the transceiver to transmit at least one first message to at least one node around the wireless station, and upon reception of at least one second message returned by at least one node, determine that at least one node transmitting the at least one second message is enabled to provide another device with the data forwarding service, wherein each of the at least one first message requests for one of the at least one second message to be returned by the at least one node enabled to provide another device with the data forwarding service around the wireless station.

8. The wireless station according to claim 5, wherein the processor is further configured to execute the at least one instruction to:
when determining that quality of a link between the wireless station and a first-hop forwarding node in the communication path is below a preset threshold, disconnect the wireless station from the first-hop forwarding node, and reselect a new communication path to access the wired network, wherein the first-hop forwarding node is the forwarding node next to the wireless station in the communication path; or
when receiving a notification message transmitted by the first-hop forwarding node in the communication path, disconnect the wireless station from the first-hop forwarding node, and reselect a new communication path to access the wired network, wherein the notification message informs the wireless station that the first-hop forwarding node is unable to continue providing the wireless station with the data forwarding service.

* * * * *